United States Patent
You et al.

(10) Patent No.: US 9,949,167 B2
(45) Date of Patent: Apr. 17, 2018

(54) METHOD FOR MEASURING INTERFERENCE AND USER EQUIPMENT FOR LTE-U

(71) Applicant: LG ELECTRONICS INC., Seoul (KR)

(72) Inventors: Hyangsun You, Seoul (KR); Yunjung Yi, Seoul (KR); Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/325,708

(22) PCT Filed: Jun. 25, 2015

(86) PCT No.: PCT/KR2015/006497
§ 371 (c)(1),
(2) Date: Jan. 11, 2017

(87) PCT Pub. No.: WO2016/006847
PCT Pub. Date: Jan. 14, 2016

(65) Prior Publication Data
US 2017/0164230 A1    Jun. 8, 2017

Related U.S. Application Data

(60) Provisional application No. 62/023,192, filed on Jul. 11, 2014, provisional application No. 62/046,178, filed on Sep. 5, 2014.

(51) Int. Cl.
*H04B 1/00* (2006.01)
*H04W 28/04* (2009.01)
(Continued)

(52) U.S. Cl.
CPC .......... *H04W 28/04* (2013.01); *H04B 17/24* (2015.01); *H04B 17/336* (2015.01);
(Continued)

(58) Field of Classification Search
CPC ... H04W 28/04; H04W 28/048; H04W 24/02; H04B 17/24; H04B 17/336; H04B 17/345
(Continued)

(56) References Cited

U.S. PATENT DOCUMENTS

| 8,041,385 B2 * | 10/2011 | Shi | H04W 60/06 370/328 |
| 8,874,124 B2 * | 10/2014 | Clegg | H04L 5/0062 455/450 |

(Continued)

FOREIGN PATENT DOCUMENTS

| WO | 2013059999 A1 | 5/2013 |
| WO | 2013129865 A1 | 9/2013 |

OTHER PUBLICATIONS

3rd Generation Partnership Project, "Technical Specification Group Radio Access Network; Evolved Universal Terrestrial Radio Access (E-UTRA); Physical Channels and Modulation (Release 10)", 3GPP TS 36.211 V10.4.0, Dec. 2011, 101 pages.
(Continued)

*Primary Examiner* — Sonny Trinh
(74) *Attorney, Agent, or Firm* — Lee, Hong, Degerman, Kang & Waimey

(57) ABSTRACT

Provided in one embodiment of the present invention is a method for measuring interference with user equipment (UE) using a licensed band and an unlicensed band, through carrier aggregation (CA) according to long term evolution-advanced (LTE-A). The method comprises the steps of: receiving, from a base station, configuration on the position of a resource for measuring interference in the unlicensed
(Continued)

band; measuring, from the position of the resource on the unlicensed band, interference from a wireless LAN (WLAN), excluding interference from the LTE-A; and reporting the measured interference to the base station.

16 Claims, 18 Drawing Sheets

(51) Int. Cl.
*H04W 24/02* (2009.01)
*H04B 17/345* (2015.01)
*H04B 17/24* (2015.01)
*H04B 17/336* (2015.01)
*H04L 1/00* (2006.01)

(52) U.S. Cl.
CPC ......... *H04B 17/345* (2015.01); *H04L 1/0026* (2013.01); *H04W 24/02* (2013.01)

(58) Field of Classification Search
USPC .................................. 455/63.1, 114.2, 278.1
See application file for complete search history.

(56) References Cited

U.S. PATENT DOCUMENTS

| 2011/0149879 | A1* | 6/2011 | Noriega ............ H04W 72/1236 370/329 |
| 2012/0113961 | A1 | 5/2012 | Krishnamurthy |
| 2012/0263123 | A1 | 10/2012 | Turtinen et al. |
| 2013/0107116 | A1 | 5/2013 | Charbit et al. |
| 2016/0073366 | A1* | 3/2016 | Ng ..................... H04W 56/001 370/329 |

OTHER PUBLICATIONS

PCT International Application No. PCT/KR2015/006497, International Search Report dated Sep. 25, 2015, 2 pages.

* cited by examiner

METHOD FOR MEASURING INTERFERENCE AND USER EQUIPMENT FOR LTE-U

CROSS-REFERENCE TO RELATED APPLICATIONS

This application is the National Stage filing under 35 U.S.C. 371 of International Application No. PCT/KR2015/006497, filed on Jun. 25, 2015, which claims the benefit of U.S. Provisional Application No. 62/023,192 filed on Jul. 11, 2014, and U.S. Provisional Application No. 62/046,178 filed on Sep. 5, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, since a larger number of recent communication devices demand much larger communication capacity, efficient utilization of finite frequency resources is getting more and more important in the next generation wireless communication system. Even a cellular communication system such as the LTE system considers using a unlicensed band such as the 2.4 GHz band employed for the existing WLAN systems or a unlicensed band such as the 5 GHz band for traffic offloading. The use of the LTE communications technology in the unlicensed band is called LTE-U.

Aside from the fact that a specific LTE-U based cell is interfered by a different LTE-U based cell, the specific cell may receive interference from a WLAN-based AP and STA.

Therefore, there needs a method for measuring such interference.

SUMMARY OF THE INVENTION

Accordingly, the disclosure of the specification has been made in an effort to solve the problem.

To achieve the object described above, one disclosure of the present invention provides a method for measuring interference for a user equipment using a licensed band and a unlicensed band through LTE-A (Long Term Evolution-Advanced) based carrier aggregation (CA). The method may comprise receiving configuration of resource positions for measuring interference in the unlicensed band from a base station; measuring interference caused by WLAN at the resource positions in the unlicensed band except for the interference due to the LTE-A; and reporting the measured interference to the base station.

To achieve the object described above, one disclosure of the present invention provides a user equipment using a licensed band and a unlicensed band through LTE-A (Long Term Evolution-Advanced) based carrier aggregation (CA). The user equipment may comprise an RF receiver; and a processor measuring interference caused by WLAN at resources positions in the unlicensed band except for the interference due to the LTE-A if receiving configuration about the resource positions for measuring interference in the unlicensed band from a base station through the RF receiver and reporting the measured interference to the base station.

The configuration about resource positions may include about a specific PRB (Physical Resource Block) region or a sub-carrier region in the frequency domain.

The specific PRB region or sub-carrier region may be distributed across the whole system bandwidth.

The configuration about resource positions may include information about the position of a specific subframe in the time domain.

The configuration about resource positions may be received through upper layer signaling.

The configuration about resource positions may be obtained from a primary cell or a secondary cell operated by the base station in the unlicensed band.

According to the disclosure of the present invention, the technical problem in the prior art described above may be solved.

DESCRIPTION OF EXEMPLARY EMBODIMENTS

Figure 1:
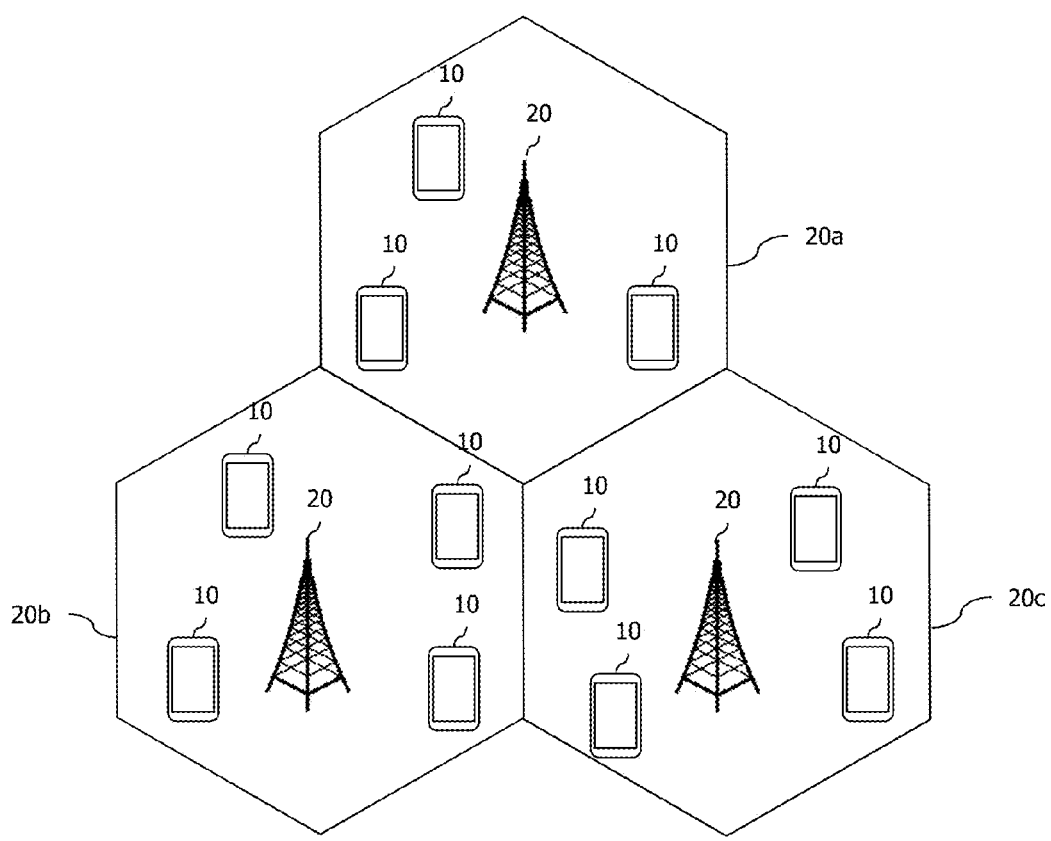
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

As seen with reference to FIG. 1, the wireless communication system includes at least one base station (BS) 20. Each base station 20 provides a communication service to specific geographical areas (generally, referred to as cells) 20*a*, 20*b*, and 20*c*. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
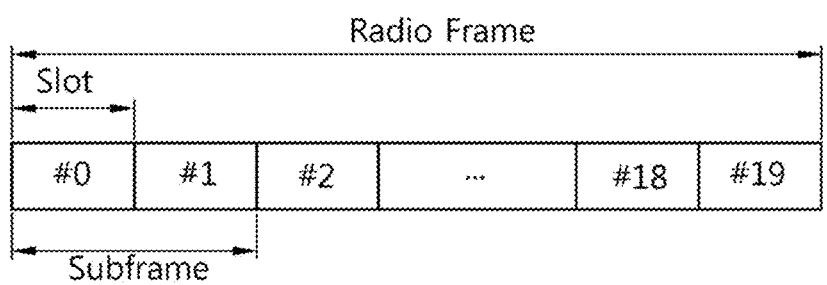
FIG. 2 illustrates a structure of a radio frame according to frequency division duplex (FDD) of 3rd generation partnership project (3GPP) long term evolution (LTE).

FIG. 2 illustrates a structure of a radio frame according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 subframes indexed 0 to 9. One subframe includes two consecutive slots. Accordingly, the radio frame includes 20 slots. The time taken for one subframe to be transmitted is denoted TTI (transmission time interval). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
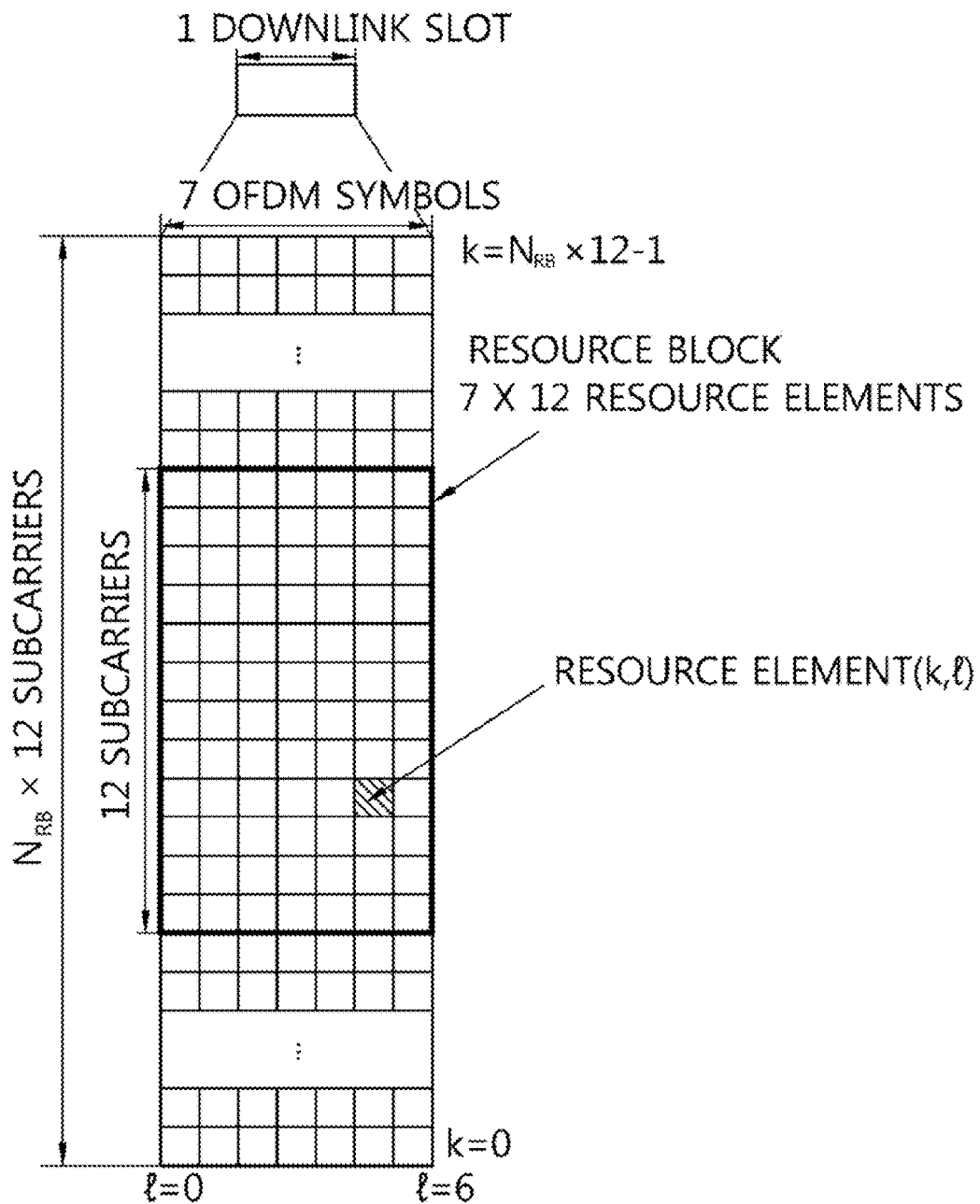
FIG. 3 illustrates an example of a resource grid for one uplink or downlink slot in 3GPP LTE.

FIG. 3 illustrates an example of a resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain.

For example, if one slot includes seven OFDM symbols in the time domain and the resource block includes 12 sub-carriers in the frequency domain, one resource block may include 7×12 resource elements (REs).

Meanwhile, the number of sub-carriers for one OFDM symbol may be chosen from among 128, 256, 512, 1024, 1536, and 2048.

Figure 4:
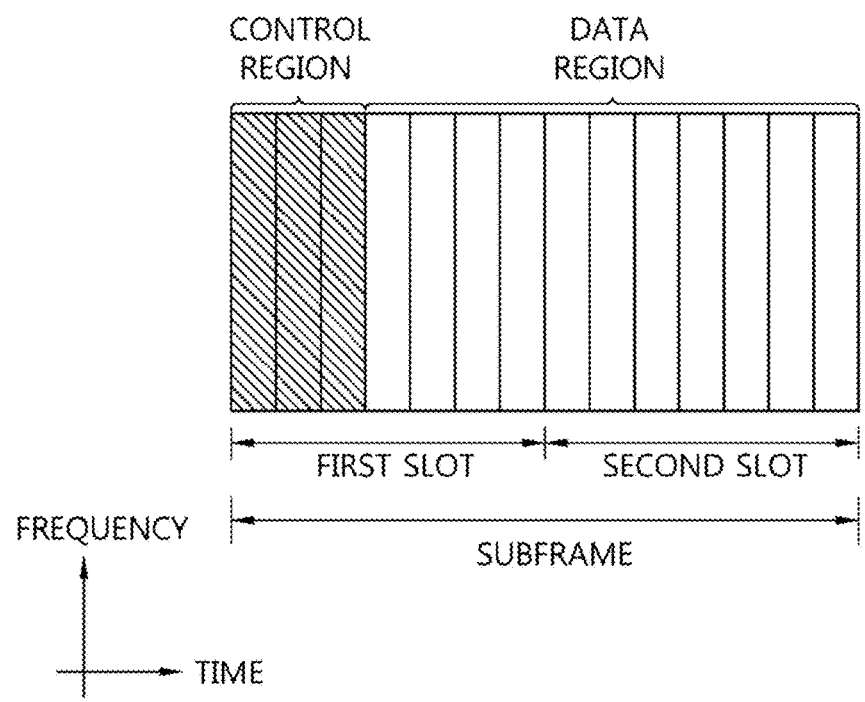
FIG. 4 illustrates a structure of a downlink subframe.

A resource grid for one uplink slot shown for the 3GPP LTE of FIG. 4 may also be applied to a resource grid for a downlink slot.

FIG. 4 illustrates a structure of a downlink subframe.

FIG. 4 assumes a normal CP in which one slot includes 7 OFDM symbols.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the subframe carries CIF (control format indicator) regarding the number (i.e., size of the control region) of OFDM symbols used for transmission of control channels in the subframe. The wireless device first receives the CIF on the PCFICH and then monitors the PDCCH.

Unlike the PDCCH, the PCFICH is transmitted through a fixed PCFICH resource in the subframe without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first subframe of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channel includes a PUSCH, PUCCH, SRC (Sounding Reference Signal), PRACH (Physical Random Access Channel).

Figure 5:
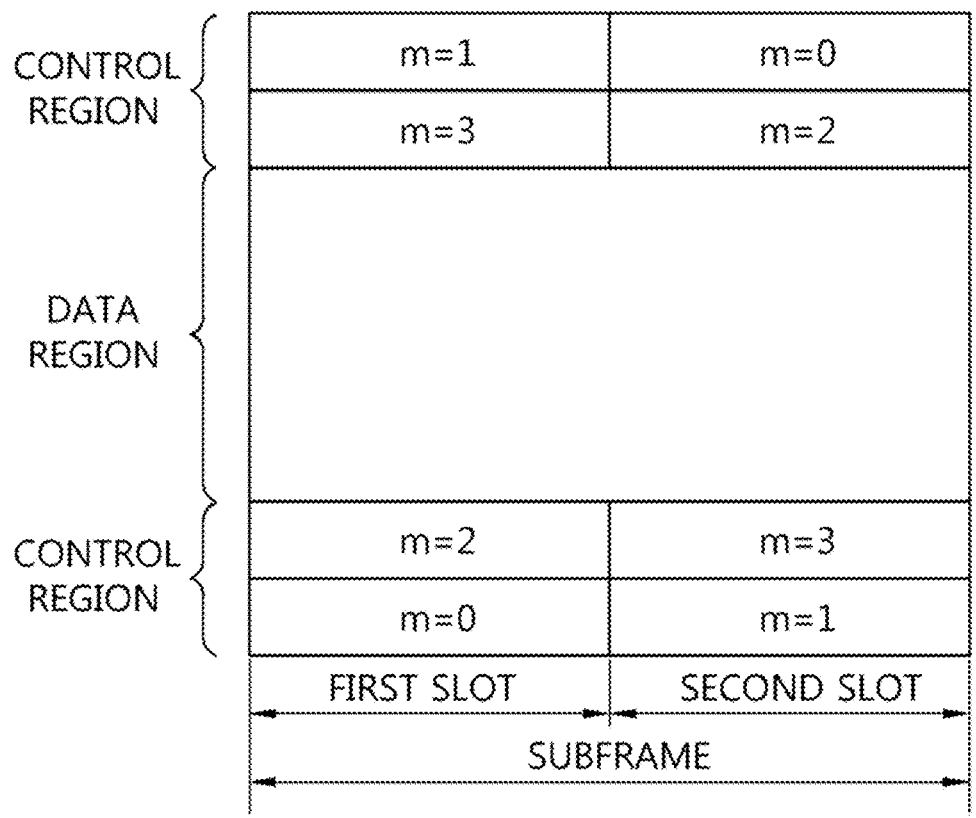
FIG. 5. illustrates a structure of an uplink subframe in 3GPP LTE.
Figure 5:
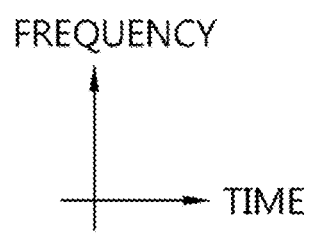

FIG. 5. illustrates a structure of an uplink subframe in 3GPP LTE.

Referring to FIG. 5, an uplink subframe may be divided into a control region and a data region in a frequency domain. The control region is allocated a PUCCH for transmission of uplink control information. The data region is allocated a PUSCH for transmission of data (along with control information in some cases).

A PUCCH for one UE is allocated a RB pair in a subframe. RBs in the RB pair take up different subcarriers in each of first and second slots. A frequency occupied by the RBs in the RB pair allocated to the PUCCH changes with respect to a slot boundary, which is described as the RB pair allocated to the PUCCH having been frequency-hopped on the slot boundary.

A UE transmits uplink control information through different subcarriers according to time, thereby obtaining a frequency diversity gain. m is a location index indicating the logical frequency-domain location of an RB pair allocated for a PUCCH in a subframe.

Uplink control information transmitted on a PUCCH may include a HARQ ACK/NACK, a channel quality indicator (CQI) indicating the state of a downlink channel, a scheduling request (SR) which is an uplink radio resource allocation request, or the like.

A PUSCH is mapped to a uplink shared channel (UL-SCH) as a transport channel. Uplink data transmitted on a PUSCH may be a transport block as a data block for a UL-SCH transmitted during a TTI. The transport block may be user information. Alternatively, the uplink data may be multiplexed data. The multiplexed data may be the transport block for the UL-SCH multiplexed with control information. For example, control information multiplexed with data may include a CQI, a precoding matrix indicator (PMI), an HARQ, a rank indicator (RI), or the like. Alternatively, the uplink data may include only control information.

<Carrier Aggregation>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

<WLAN>

In what follows, operation of WLAN will be disclosed.

Figure 6A:
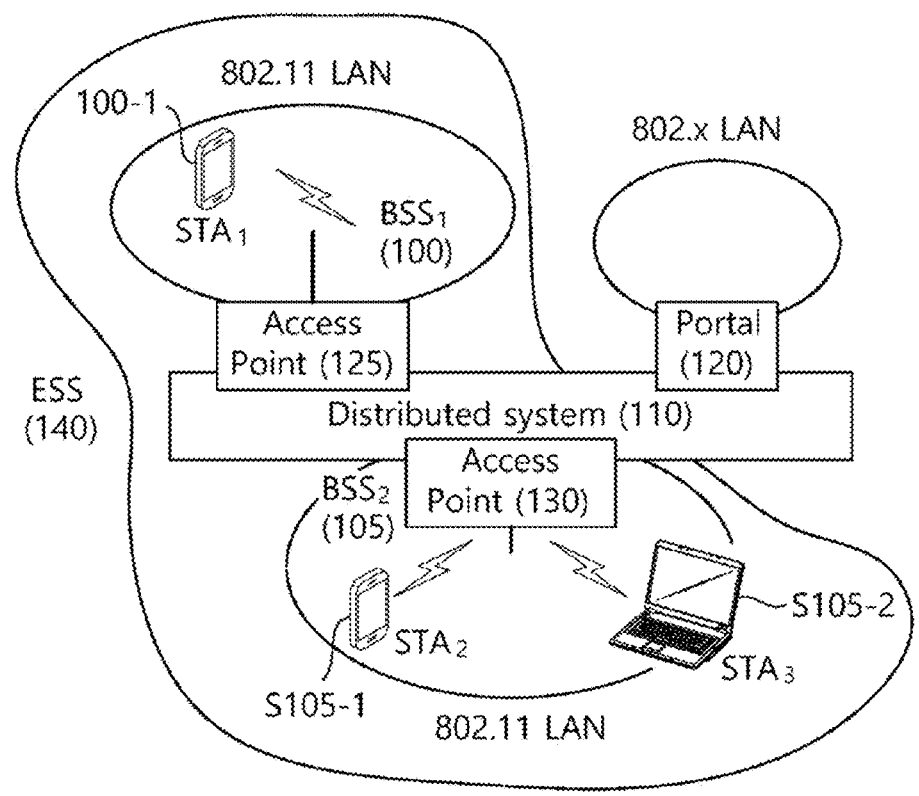
FIG. 6a illustrates the structure of WLAN (Wireless Local Area Network).

FIG. 6a illustrates the structure of WLAN (Wireless Local Area Network).

FIG. 6a illustrates the structure of the infrastructure network of the IEEE (Institute of Electrical and Electronic Engineers) 802.11.

With reference to FIG. 6a, a WLAN system may include one or more basic service set (BSS) 500, 505. A BSS 500, 505 is a set of APs and STAs which synchronize successfully and communicate with each other, such as the AP (Access Point) 525 and the STA1 (Station) 500-1 but is not a concept for indicating a specific region. A BSS 505 may include one or more STAs 505-1, 505-2 that may be combined with one AP 530.

An infrastructure BSS may include at least one STA, APs 525, 530 providing a distributed service, and a distribution system (DS) 510 which connects a plurality of APs to each other.

A distributed system 510 may implement an ESS (Extended Service Set) 540 by connecting several BSSs 500, 505 to each other. The ESS 540 may be used as a terminology indicating one network formed by one or more APs 525, 530 being connected to each other through a distributed system 510. APs included in the ESS 540 may have the same SSID (Service Set IDentification).

A portal 520 may perform the function of a bridge which connect a WLAN network (IEEE 802.11) to a different network (for example, 802.X).

In the infrastructure network as shown in FIG. 6a, a network comprising APs 525, 530 and a network comprising APs 525, 530 and STAs 500-1, 505-1, 505-2 may be implemented. However, it is equally possible to form a network consisting of STAs only without involving APs 525,530 to perform communication. A network performing communication by forming a network among STAs without APs 525,530 is defined as an ad-hoc network or an independent BSS (Basic Service Set).

Figure 6B:
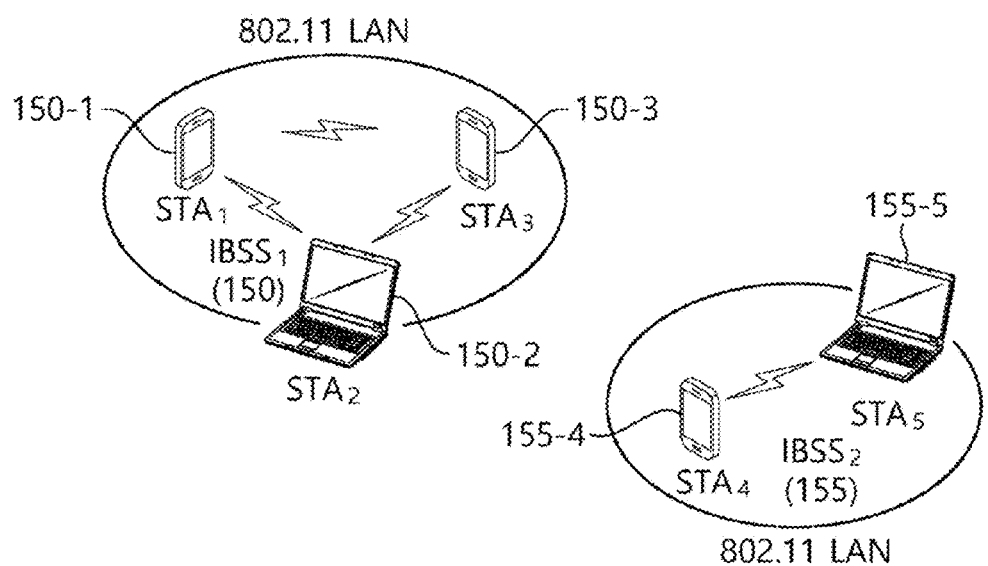
FIG. 6b illustrates an independent BSS.

FIG. 6b illustrates an independent BSS.

With reference to FIG. 6b, an independent BSS operates in the ad-hoc mode. Since an IBSS does not include an AP, there is no centralized management entity. In other words, an IBSS manages STAs 550-1, 550-2, 550-3, 555-4, 555-5 in a distributed manner. All of the STAs 550-1, 550-2, 550-3, 555-4, 555-5 belonging to an IBSS may be mobile STAs and form a self-contained network since access to a distributed system is not allowed for mobile STAs.

An STA is an arbitrary functional medium including MAC (Medium Access Control) compliant with specifications of the IEEE 802.11 standard and a physical layer interface for a wireless medium; and may be used to indicate both of AP and non-AP STA (Station) in a broad sense.

An STA may be called in various ways: a mobile terminal, wireless device, Wireless Transmit/Receive Unit (WTRU), User Equipment (UE), Mobile Station (MS), Mobile Subscriber Unit (MSU), or simply a user.

Figure 7:
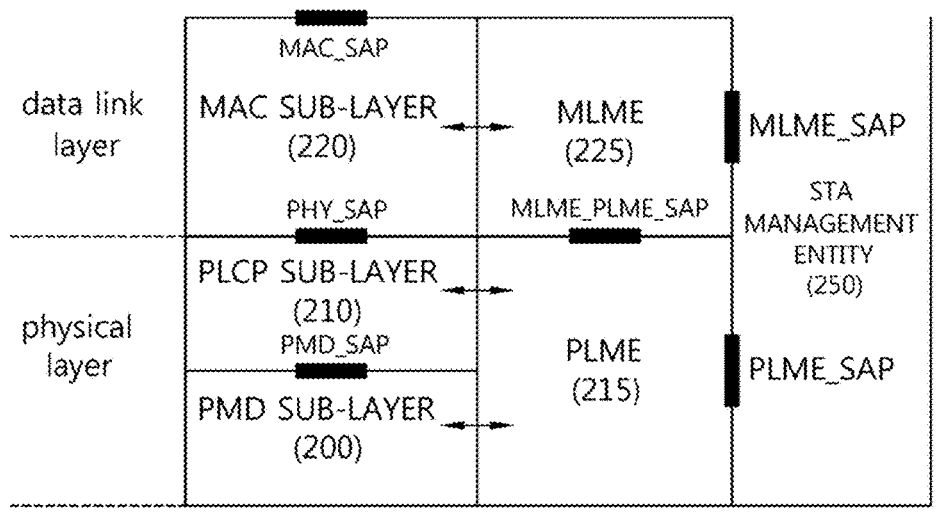
FIG. 7 illustrates PHY architecture of a WLAN system supported by the IEEE 802.11.

FIG. 7 illustrates PHY architecture of a WLAN system supported by the IEEE 802.11.

FIG. 7 provides conceptual illustration of PHY architecture of a WLAN system.

The PHY architecture of a WLAN system may include a MAC (Medium Access Control) sublayer 620, PLCP (Physical Layer Convergence Procedure) sublayer 610, and PMD (Physical Medium Dependent) sublayer 600. The PLCP sublayer 610 is designed so that the MAC sublayer 620 may operate with minimum dependency on the PMD sublayer 600. The PMD sublayer 600 may perform the role of transmission interface for transmitting and receiving data among a plurality of STAs.

The MAC sublayer 620, PLCP sublayer 610, and PMD sublayer 600 may conceptually include a management entity.

The management entity of the MAC sublayer 620 is called an MLME (MAC Layer Management Entity) 625, and a management entity of PHY layer is called PLME (PHY Layer Management Entity) 615. These management units may provide an interface through which a layer management operation is performed. The PLME 615 may perform a management operation of the PLCP sublayer 610 and PMD sublayer 600 by being connected to the MLME 625, and the MLME 625 may also perform the management operation of the MAC sublayer 620 by being connected to the PLME 615.

To ensure proper MAC layer operation, an SME (STA Management Entity) 650 may be employed. An SME 650 may be operated as a constituting element independent of the layer architecture. The MLME, PLME, and SME may transmit and receive information to and from constituting elements by using primitives.

In what follows, operation of each sublayer is described briefly. The PLCP sublayer 610 located between the MAC sublayer 620 and the PMD sublayer 600 either delivers an MPDU (MAC Protocol Data Unit) received from the MAC sublayer 620 to the PMD sublayer 600 according to a command of the MAC layer or deliver a frame coming from the PMD sublayer 600 to the MAC sublayer 620. The PMD sublayer 600, which is a lower layer of the PLCP sublayer, may perform transmission and reception of data among a plurality of STAs through a wireless medium. The MPDU (MAC Protocol Data Unit) delivered by the MAC sublayer 620 is called a PSDU (Physical Service Data Unit) within the PLCP sublayer 610. The MPDU is similar to the PSDU, but in case an A-MPDU (Aggregated MPDU), which is aggregation of a plurality of MPDUs, is delivered, individual MPDUs and PSDUs may be different from each other.

The PLCP sublayer 610 attaches an additional field which carries necessary information by using a PHY layer transceiver while receiving a PSDU from the MAC sublayer 620 and delivering the PSDU to the PMD sublayer 600. At this time, the additional field may comprise tail bits required to return the PLCP preamble, PLCP header, and convolution encoder of the PSDU to a zero state. The PLCP preamble may be used to make a receiver to prepare a synchronization function and antenna diversity before a PSDU is transmitted. A data field may include a service field which includes a bit sequence for initializing padding bits and scrambler for a PSDU and a coded sequence which encodes a bit sequence to which tail bits are attached. At this time, either BCC (Binary Convolution Coding) encoding or LDPC (Low Density Parity Check) encoding may be selected according to the encoding scheme supported by an STA receiving a PPDU. The PLCP header may include a field which includes information about PPDU (PLCP Protocol Data Unit) to be transmitted.

The PLCP sublayer 610 generates a PPDU (PLCP Protocol Data Unit) by adding the aforementioned field to the PSDU and transmits the generated PPDU to a receiving station via the PMD sublayer 600. The receiving station receives the PPDU, obtains information required for data reconstruction from the PLCP preamble and PLCP header, and performs data reconstruction.

<LTE-U (LTE-Unlicensed Spectrum)>

Since a larger number of recent communication devices demand much larger communication capacity, efficient utilization of finite frequency resources is getting more and more important in the next generation wireless communication system. Even a cellular communication system such as the LTE system considers using a unlicensed band such as the 2.4 GHz band employed for the existing WLAN systems or a unlicensed band such as the 5 GHz band for traffic routing. The use of the LTE communications technology in the unlicensed band is called LTE-U.

By default, it is assumed that wireless communication in the unlicensed band is accomplished through competition among individual communication nodes; thus, it is demanded that each communication node performs channel sensing before transmitting a signal to ensure other communication nodes are not transmitting signals. This scheme is called CCA (Clear Channel Assessment), and even a base station or a UE based on the LTE system may have to perform CCA for signal transmission in the unlicensed band (for the sake of convenience, it is called an LTE-U band). In order not to cause interference, it is also required for other communication nodes such as those based on WLAN to perform CCA when a base station or a UE in the LTE system transmits a signal. For example, the CCA threshold value in the WLAN standard (801.11ac) is defined as −62 dBm for a non-WLAN signal and −82 dBm for a WLAN signal, which indicates that a station (STA) or an AP (Access Point) does not transmit a signal in order to avoid causing interference when a signal other than a WLAN signal having power exceeding −62 dBm is received. To be specific, if an STA or an AP does not detect a signal of which the power exceeds the CCA threshold value for more than 4 us in the WLAN system, the STA or the AP may perform CCA and signal transmission.

In what follows, for the convenience of description, a base station and a UE of the LTE/LTE-A system is denoted as an eNodeB and a UE while a base station and a UE of the WLAN system is denoted as an AP and an STA.

Although various systems are used in the unlicensed band, the system which may bring the largest influence, particularly, on the LTE-A system and which may receive the largest influence when the LTE-A system is used in the unlicensed band is a WLAN system based on the IEEE 802.11. The basic operation scheme of a WLAN system is based on carrier sensing (CS) of CSMA/CA (Carrier Sense Medium Access/Collision Avoidance). The WLAN system mandates that every STA including AP performs carrier sensing as described above.

Figure 8:
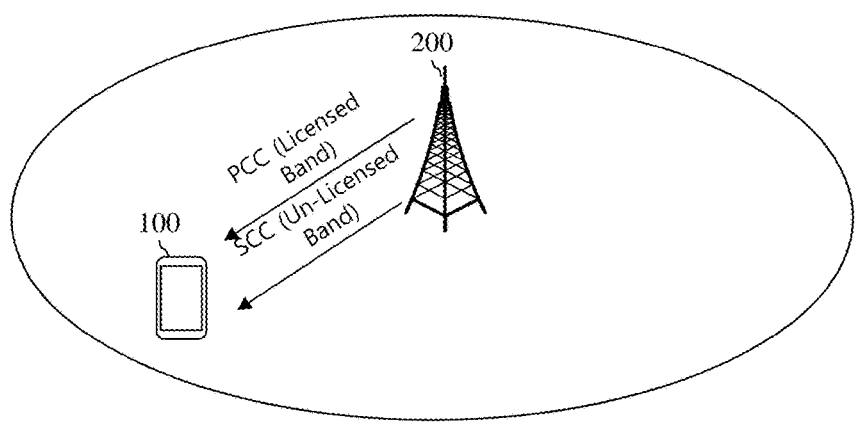
FIG. 8 illustrates one example of using a licensed band and a unlicensed band for carrier aggregation (CA).

FIG. 8 illustrates one example of using a licensed band and a unlicensed band for carrier aggregation (CA).

According to one disclosure of the present invention, as shown in FIG. 8, an eNodeB 200 may transmit a signal to a UE 100 or the UE may transmit a signal to the eNodeB by using carrier aggregation in the LTE-A band, which is the licensed band, and in the unlicensed band to transmit and receive a signal through a carrier component for the unlicensed band in which exclusive use of a specific system is not allowed. As one example, a carrier component in the licensed band may be interpreted as a primary carrier component (which may be called a PCC or a PCell) while a carrier component in the unlicensed band may be interpreted as a secondary carrier component (which may be called an SCC or an SCell). However, the proposed methods of the present invention may be extended for the case in which a plurality of licensed bands and a plurality of unlicensed bands are utilized by a carrier aggregation scheme or for the case in which signal transmission and reception between an eNodeB and a UE is performed only in the unlicensed band. Also, not only for the 3GPP LTE system, the proposed methods of the present invention may be extended to be used for systems with different features from those of the 3GPP LTE system.

Meanwhile, as one example of operation in the unlicensed band according to contention-based random access, the eNodeB 200 may first perform carrier sensing (CS) before transmitting and receiving data. The eNodeB 200 may check whether a current channel status of an SCell operating in the unlicensed band is busy or idle. If it is determined that the SCell is in the idle state, the eNodeB 200 may transmit a scheduling grant through (E)PDCCH of the PCell, namely cross carrier scheduling (CCS) or (e)PDCCH of the SCell and may attempt data transmission and reception.

At this time, aside from the fact that a specific LTE-U based cell receives interference from other LTE-U based cells, the specific LTE-U based cell may also receive interference from a WLAN based AP and STA. At this time, in case a resource region to which a WLAN-based signal belongs overlaps a resource region to which an LTE based signal, the two signals may not be distinguished from each other but may cause interference on the specific LTE-U based cell together.

Figure 9:
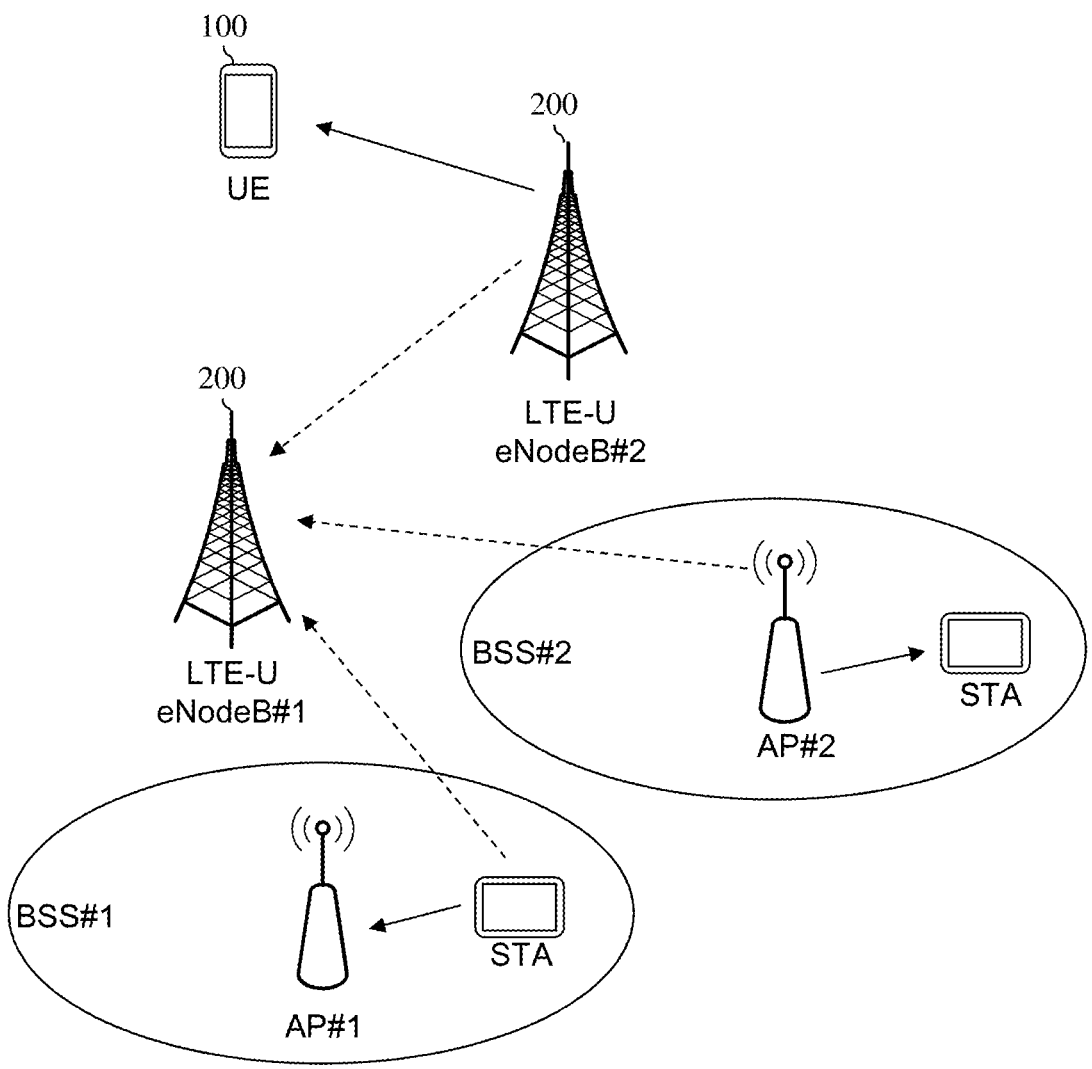
FIG. 9 illustrates an example in which an LTE-A based eNodeB operating in a unlicensed band receives interference.

FIG. 9 illustrates an example in which an LTE-A based eNodeB operating in a unlicensed band receives interference.

FIG. 9 illustrates a situation in which an LTE-U based eNodeB#1 operating in the unlicensed band receives interference from a neighboring LTE#2 and WLAN-based BSSs.

In FIG. 9, solid line represents a signal delivered to a target receiver while dotted line represents interference imposed on the LTE-U based eNodeB#1 rather than the target receiver. Such interference signal may include an LTE downlink signal transmitted by a different LTE-U based eNodeB#2 the operating band of which fully or partly overlaps the operating band of the LTE-U based eNodeB#1, an LTE uplink signal transmitted by a UE to a different LTE-U based eNodeB#2 operating band of which fully or partly overlaps the operating band of the LTE-U based eNodeB#1, or a WLAN signal transmitted by a WLAN BSS, namely AP or non-AP STAs, operating band of which fully or partly overlaps the operating band of the LTE-U based eNodeB#1.

At this time, in case the UE 100 performs measurement by using a specific resource area to measure RSSI (or amount of interference), the interference received from the eNodeB#2 based on a neighboring LTE-U and the interference received from neighboring WLAN BSSs are measured being intermingled together. At this time, interference between LTE-U based eNodeBs may be solved anyhow through inter-cell coordination and the like, but the interference coming from WLAN BSSs is hard to be removed. Therefore, it is impractical to consider that the interference received from a neighboring LTE-U based eNodeB#2 exerts the same effect as the interference received from a WLAN BSS on the LTE-U based eNodeB#1. If the interference from the LTE-U based eNodeB#2 and/or the interference from the WLAN BSS may be measured separately from the whole interference, and the inference measurement may be reported to the eNodeB#1, it can be an aid in view of interference management.

DETAILED DISCLOSURE OF THE PRESENT INVENTION

One disclosure of the present invention proposes techniques for measuring interference caused by neighboring WLAN or LTE-U signals separately on the LTE system operating in the unlicensed band. More specifically, one disclosure of the present invention proposes a technique for measuring interference caused by LTE-U based neighboring cells and/or interference caused by WLAN BSSs separately from the whole interference (total interference coming from the LTE-U based cells and from neighboring WLAN BSSs).

In what follows, for the convenience of description, it is assumed that an LTE-U based cell operates in the operating bandwidth of 20 MHz, but it is clear that the description below may also be applied to those cells operating in different bandwidths.

I. First Disclosure: The Case in which Only the LTE-Frequency Resources are Used (Measurement of Interference from the LTE System)

I-1. Use of Outer PRB Resources

For most cases, even if both of the LTE system and the WLAN system operate in the 20 MHz bandwidth, bandwidth used for actual transmission is smaller than 20 MHz.

To help understand the situation, frequency bandwidth employed for the LTE/LTE-A system and frequency bandwidth employed in the WLAN system are described.

Figure 10A:
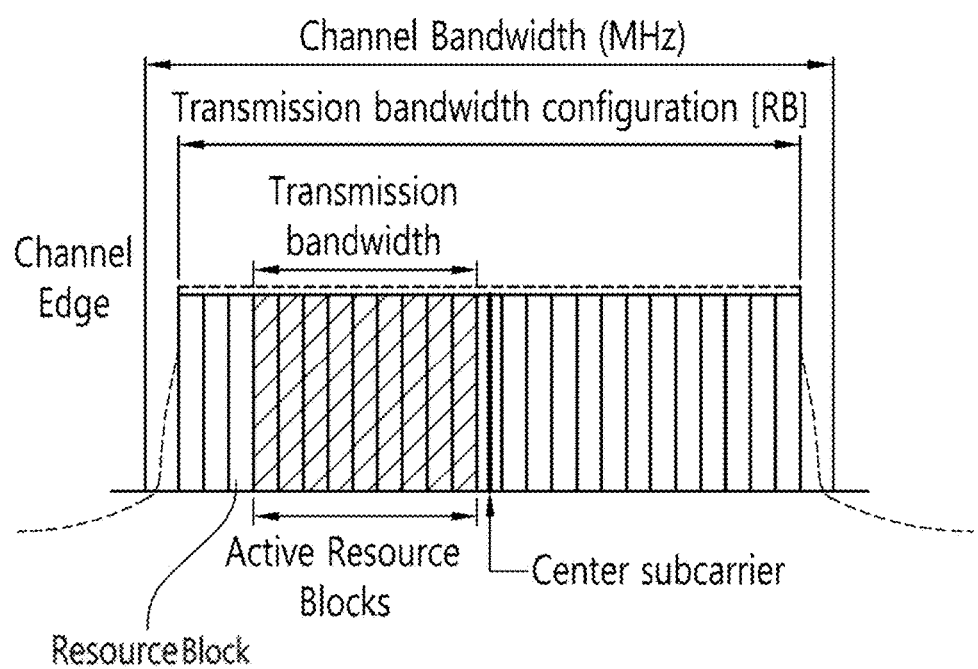
FIG. 10a illustrates a relationship between channel bandwidth and transmission bandwidth defined in the LTE/LTE-A specification.

FIG. 10a illustrates a relationship between channel bandwidth and transmission bandwidth defined in the LTE/LTE-A specification.

The 3GPP LTE system supports 1.4 MHz, 3 MHz, 5 MHz, 10 MHz, 15 MHz, and 20 MHz as channel bandwidth.

However, as shown in FIG. 10a, transmission bandwidth of the LTE/LTE-A system in which actual transmission may be performed is smaller than the channel bandwidth (BW-Channel). Setting of transmission bandwidth is performed by a plurality of resource blocks (RBs). More specifically, in the LTE/LTE-A system, even if a specific cell has a channel bandwidth of 20 MHz, the transmission bandwidth over which an actual signal is transmitted corresponds to an area comprising 100 PRB s, corresponding approximately to 18.18 MHz.

Figure 10B:
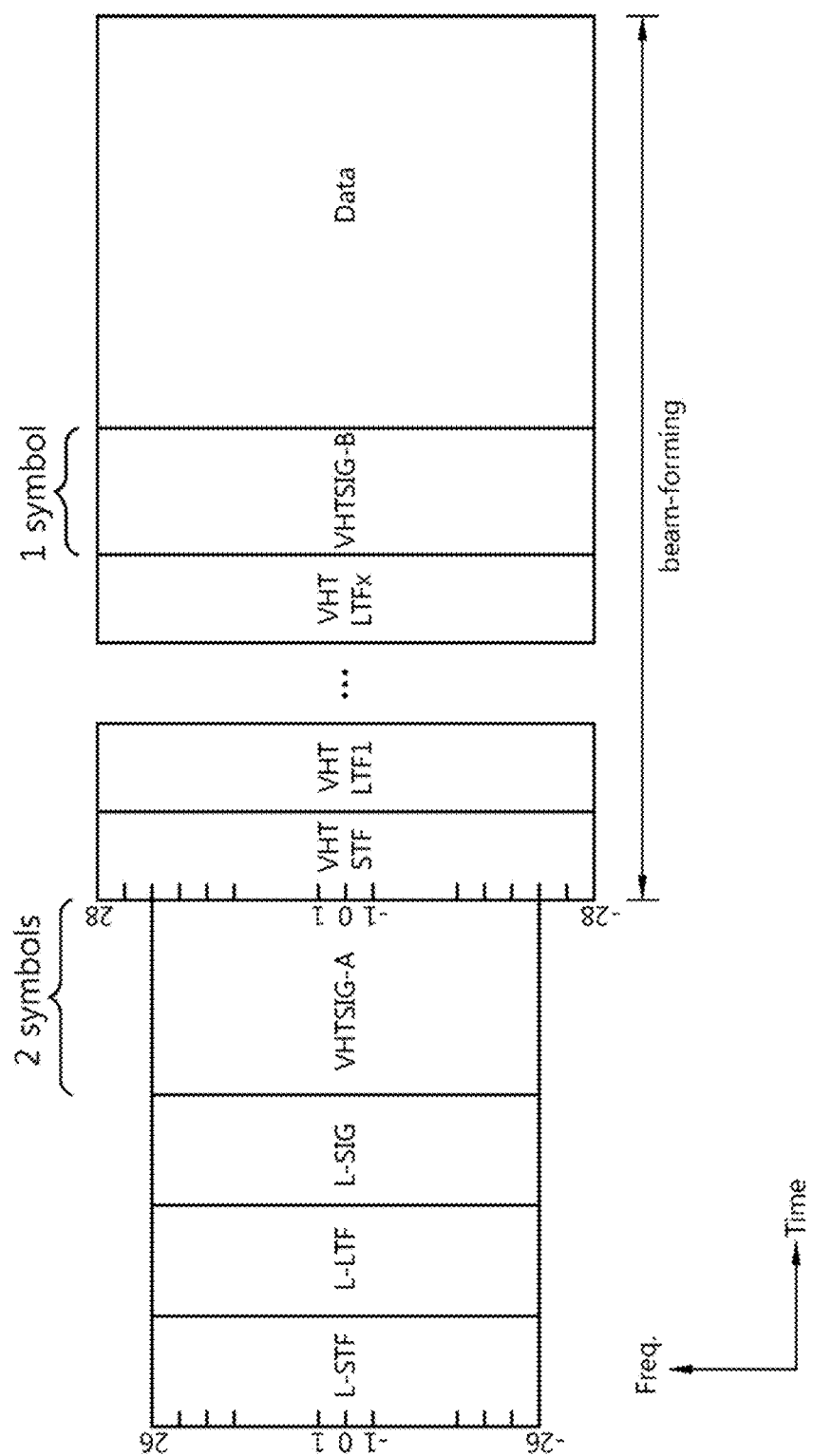
FIG. 10b illustrates operating bandwidth defined in the WLAN system.

FIG. 10b illustrates operating bandwidth defined in the WLAN system.

As shown in FIG. 10b, in the 802.11n/ac system, even though 20 MHz is given as the operation bandwidth, for the case of frames in the 802.11n/ac system transmitting data except for RTS, CTS, ACK, and beacon, L-STF to VHTSIG-A are transmitted through the frequency region of about 16.56 MHz while VHT-STF to the end of frame are transmitted through the frequency region of about 17.81 MHz. Also, even if 20 MHz is given as the operation bandwidth in the 802.11a system, frames in the 802.11a system or frames such as RTS, CTS, ACK, and beacon in the 802.11n/ac system are transmitted through the frequency region of about 16.56 MHz.

With reference to both of FIGS. 10a and 10b, even if both of the LTE system and the WLAN system operate in the bandwidth of 20 MHz, the size of a frequency region to which an actual LTE signal is transmitted is larger than the size of the frequency region to which a WLAN signal is transmitted. If the central frequencies for the LTE frame and the WLAN frame are the same, a WLAN signal does not impose interference on the edge part of the frequency region of the LTE frame; only a signal transmitted from a neighboring LTE-U based cell imposes interference.

Therefore, the present invention proposes a method for a UE in the LTE-U cell to measure the amount of interference received from neighboring LTE-U cells, for example, RSSI (Received Signal Strength Indicator), by using both edges of the frequency region of a frame. More details thereof will be described with reference to FIG. 11.

Figure 11:
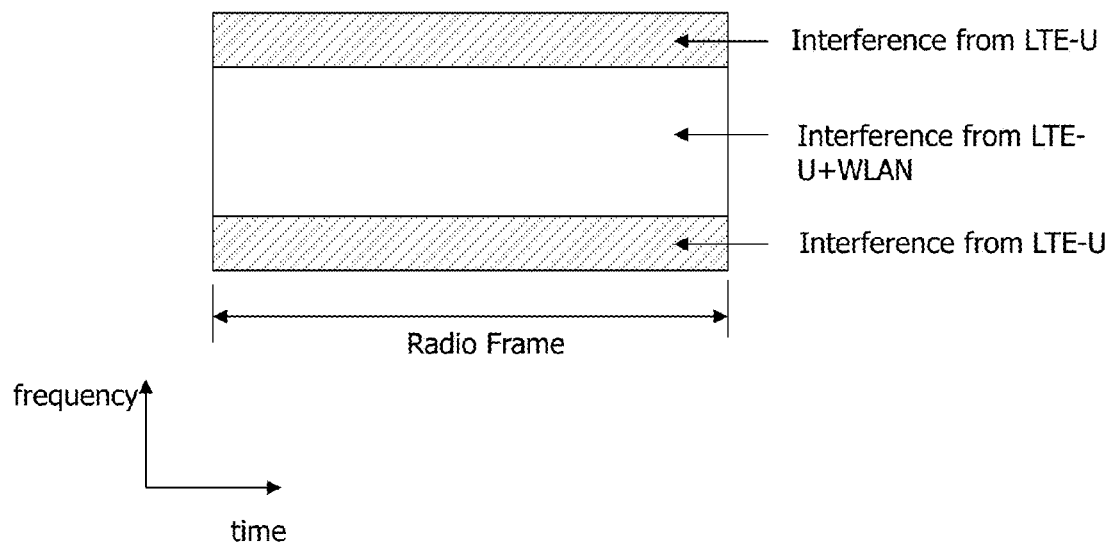
FIG. 11 illustrates resource regions for measuring interference according to one embodiment of the present invention.

FIG. 11 illustrates resource regions for measuring interference according to one embodiment of the present invention.

With reference to FIG. 11, the central part of radio resource receives interference due to neighboring LTE-U cells and neighboring WLAN BSSs while both edges along the frequency axis receives interference due to neighboring LTE-U cells only. Therefore, one embodiment of the present invention proposes measuring the amount of interference received from neighboring LTE-U cells (for example, RSSI) by using both edge parts of the frequency region for a frame. More specifically, taking into account the size of the frequency resource region of a frame transmitted according to the 802.11n/ac system, the amount of interference (for example, RSSI) received from neighboring LTE-U cells excluding the interference coming from the WLAN through 1 PRB region at either edge part of each frequency resource may be measured. Similarly, considering all of the frames in the 802.11c system or the size of the frequency resource region of frames such as RTS, CTS, ACK, and beacon in the 802.11n/ac system, in particular, the total amount of interference (for example, RSSI) received from LTE-U cells and WLAN BSSs may be measured through 2 PRB regions at either edge part of the frequency resource.

On the other hand, considering the size of a frequency resource region of a frame transmitted in the 802.11n/ac, the total amount of interference (for example, RSSI) received from neighboring LTE-U cells and neighboring WLAN BSSs may be measured through the frequency resource region except for 1 PRB resource at either edge part of the frequency resource. More specifically, considering all of the frames in the 802.11a system or the size of the frequency resource region of frames such as RTS, CTS, ACK, and beacon in the 802.11n/ac system, the total amount of interference (for example, RSSI) received from neighboring LTE-U cells and WLAN BSSs may be measured through the frequency resource region except for 2 PRB resources at either edge part of the frequency resource.

If the LTE-A system operates in the 20 MHz bandwidth within the unlicensed band and uses a region larger than 100 RBs (for example, 110 RBs), the PRB region in which the amount of interference received from neighboring LTE-U cells is measured may be increased by 5 PRBs for each edge part. Or in this case, only the 5 PRB region at either edge of the frequency region of a frame may be used for measuring the amount of interference (for example, RSSI) received from neighboring LTE-U cells.

I-2. Use of Frequency Resources in the Central Region

The present invention proposes a UE in the LTE-U cell to measure the amount of interference (for example, RSSI) received from LTE-U cells by using the frequency region at about 312.5 KHz of a frame. To help understand the description, the central frequency of the WLAN system will be described first with reference to FIG. 12.

Figure 12:
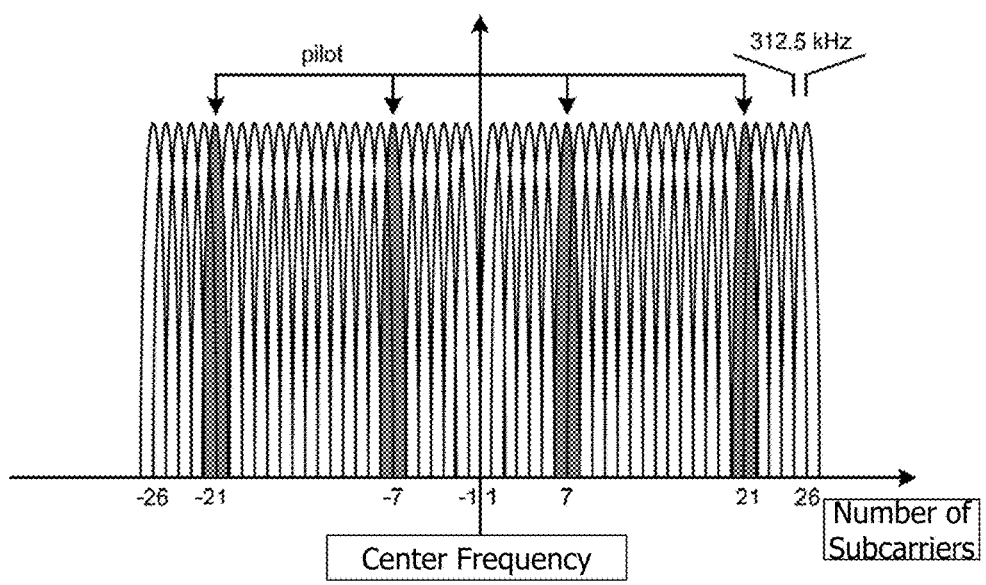
FIG. 12 illustrates a channel central frequency of the WLAN system.

FIG. 12 illustrates a channel central frequency of the WLAN system.

As can be seen from FIG. 12, one central subcarrier corresponding to DC region is left empty in the WLAN system and not used for signal transmission. At this time, the frequency resource region to which signals are not transmitted due to DC tone is 312.5 KHz, which corresponds to the region covering about 20 subcarriers compared with the LTE system. Therefore, in the central frequency region of 312.5 KHz, WLAN signals are not transmitted. As a result, it may be considered that in the DC region among the unlicensed band in which an arbitrary LTE-U cell operates, only the signal transmitted by neighboring LTE cells are received.

Therefore, one embodiment of the present invention proposes that the UE measures the amount of interference (for example, RSSI) received from LTE-U cells by using the frequency region of a frame around 312.5 KHz. More specifically, one embodiment of the present invention proposes that the UE measures the amount of interference (for example, RSSI) received from LTE-U cells by using about 20 subcarriers from the frequency region of a frame in the LTE-U cell. This is so because the number of subcarriers that may be included in the frequency region around 312.5 KHz is 20.

II. Second Disclosure: Measuring Interference from Non-LTE Systems by Using RRM-IM Resources (by Using Only the Resource Region of the WLAN)

The second disclosure proposes generating a resource interval in the LTE-U frame where signals are transmitted with zero-power to measure the interference from WLAN BSSs separately from the whole interference (the total amount of interference received from LTE-U cells and neighboring WLAN BSSs) and measuring the amount of interference (for example, RSSI) from WLAN BSSs by using the resource interval.

II-1. Application to RRM Measurement (for Example, RSSI, RSRQ)

In what follows, for the convenience of description, the resource region for measuring the amount of interference except for the interference from LTE-U cells (for example, the amount of interference from WLAN BSSs) is called RRM-IM (Interference Measurement). At this time, the UE may measure the amount of interference except for the interference from LTE-U cells (for example, the amount of interference from WLAN BSSs) through the RRM-IM resource region, namely RSSI value excluding the interference effect from LTE-U cells. And the UE may measure the total amount of interference (for example, RSSI) including the interference from WLAN BSSs and LTE-U cells by using the resources other than the RRM-IM resources.

At this time, the present invention proposes that the UE uses the following method to measure RSSI and RSRQ.

It is proposed that the UE uses RRM-IM resources together when measuring RSSI in the unlicensed band. At this time, the RSSI value in the unlicensed band may be obtained by subtracting the amount of interference measured on the RRM-IM resources from the RSSI value measured according to existing methods, namely E-UTRA subcarrier RSSI. At this time, the RSSI value measured according to the existing method, namely E-UTRA subcarrier RSSI may include a linear average of the entire received power due to all of interference sources (serving cell, other cells other than the serving cell, neighboring channel, thermal noise, and so on) on the OFDM symbols including reference symbols with respect to the antenna port 0 on the N resource blocks in the measurement bandwidth. In case a upper layer signal designates specific subframes for measuring RSRQ, RSSI may be measured on the entire OFDM symbols within the designated subframes.

More specifically, suppose the RSSI value in the unlicensed band is denoted as RSSI_u, the RSSI value measured according to existing methods is denoted as RSSI_1, and the amount of interference measured through RRM_IM resources is denoted as RSSI_w. Then RSSI_u may be defined as RSSI_u=RSSI_1−α*RSSI_w. At this time, the RSSI value used for calculating RSRQ may be replaced with a newly defined RSSI_u. At this time, RSSI_w may be defined as follows.

RSSI_w may be obtained as a linear average of the total received power (in [W]) measured from individual RE resources in which one RRM_IM resource is located over all RE regions in which RRM_IM resources are located (within a measurement subframe/bandwidth interval). In this case, a value may be the same as the amount of resources used for measuring RSSI_1/the amount of resources used for measuring RSSI_w; for example, in case RSSI_1 is measured through 100 RB regions over 4 OFDM symbols for one subframe interval, and RSSI_w is measured through a total of 200 RE regions for one subframe interval, a value may be obtained as (12*100*4)/200=24.

More specifically, the portion of resources (for example, the number of REs) occupied by the RRM_IM resources is the same for the entire OFDM symbol regions in which RRM_IM resources are located, RSSI_w may be obtained as a linear average of the total received power (in [W]) measured from the RRM_IM resources in one OFDM symbol (within a measurement bandwidth interval) with respect to the OFDM symbol regions in which RRM_IM resources are located (within a measurement subframe interval). In this case, a value may be the same as the amount of frequency region resources (per OFDM symbol) used for measuring RSSI_1/the amount of resources of frequency region resources (per OFDM symbol) used for measuring RSSI_w; for example, in case RSSI_1 is measured through 100 RB regions in the frequency region, and RSSI_w is measured through 100 RE regions in the frequency region, a value may be obtained as (12*100)/100=12.

Meanwhile, another method for measuring RSSI and RSRQ according to the present invention proposes that the UE reports RSSI and/or RSRQ measured from RRM-IM resources separately to the eNodeB. The eNodeB may separately request the UE to perform RSSI and/or RSRQ measurement by using the RRM_IM resources in the same way for requesting ordinary RRM (for example, RSRP, RSRQ) from the UE. Similarly, the UE may report the RSSI and/or RSRQ value measured by using the RRM_IM resources together when reporting RSRQ to the eNodeB. The UE which has measured the RSSI and/or RSRQ value measured from the RRM-IM resources may report the measured value to the eNodeB through upper layer signaling. In other words, the UE may report the RSSI_w value proposed earlier to the eNodeB in addition to the existing RSRQ reporting. Or the UE may report the RSRQ value obtained from the RSSI_w (namely RSRQ_w) to the eNodeB in addition to the existing RSRQ reporting. At this time, a specific value of RSRQ_w may be obtained as follows. RSRQ_w=β×RSRP/RSSI_w. At this time, β value may be the same as the amount of resources used for measuring RSRP/the amount of resources used for measuring RSSI_w.

II-2. Application to CSI Measurement

When measuring interference from neighboring cells to measure CSI in the unlicensed band, the UE may use CSI-IM resources as done in the existing LTE-A system. However, when the existing CSI-IM resource region is used, the UE only measures the interference caused by mixed signals from neighboring LTE-U cells and WLAN BSSs. At this time, a signal transmitted from the WLAN system exhibits a relatively short length ranging from tens of μsec to a few msec and is transmitted in the form of a burst signal. Therefore, in the unlicensed band, interference from the WLAN signal is likely to occur only through some OFDM symbol areas while the LTE subframe is transmitted. Because it is difficult to determine the time interval for which interference from WLAN signals is received and size of the interference, it is highly probable that the interference from LTE-U cells and the signal from the WLAN BSSs are not distinguished from each other, but average interference value during one or multiple subframes may be measured.

Meanwhile, if the interference from the WLAN BSSs may be measured separately, the amount of interference due to the WLAN BSSs may be distinguished from the total amount of interference due to LTE-U cells and WLAN BSSs measured by using CSI-IM resources. At this time, the RRM-IM resources proposed in Section II may be used to measure the interference due to WLAN BSSs separately.

Therefore, for CSI measurement, the present invention proposes using the amount of interference measured from the RRM-IM resources together with the amount of interference measured from the CSI-IM resources. To this purpose, the following method may be used. For the convenience of description, the amount of interference measured from the CSI-IM resources is called I_CSI-IM, and the amount of interference measured from the RRM-IM resources is called I_RRM_IM.

First illustrative approach: CSI measurement is reported together with I_CSI_IM value and I_RRM-IM value.

The first illustrative approach proposes that the UE uses not only the I_CSI-IM value measured from CSI-IM resources but also the I_RRM-IM value measured from RRM-IM resources to calculate the amount of interference when CSI is measured. As one example, when CSI is measured, the value obtained by subtracting I_RRM-IM value from I_CSI-IM value may be used as the amount of interference. The UE may then report the measured CSI value to the eNodeB. This measurement method is intended not to take into account the interference received from WLAN BSSs in the CSI measurement considering that the interference received from WLAN BSSs affects only part of the OFDM symbol regions.

Second illustrative approach: CSI value considering I_RRM_IM and CSI value not considering the I_RRM_IM are reported together.

The second illustrative approach proposes that when measuring CSI, the UE calculates the CSI value separately, which is obtained by using a) the CSI value calculated by taking into account only the I_CSI-IM value measured from the CSI-IM resources according to the existing methods as the amount of interference, b) I_CSI-IM value measured from the CSI-IM resources, and I_RRM-IM value measured from the RRM-IM resources together for calculating the amount of interference; and reports the two CSI values to the eNodeB. At this time, one way to calculate the CSI value in b) is to use the value obtained by subtracting I_RRM-IM value from the I_CSI-IM value as the amount of interference.

Third illustrative approach: I_RRM_IM value is reported additionally with the existing CSI value.

According to the third illustrative approach, the UE may measure the amount of interference by using only the CSI-IM resources as done in the existing methods and report the obtained CSI value to the eNodeB. At this time, the UE may additionally report the amount of interference (I-RRM_IM) measured from the RRM-IM resources to the eNodeB.

Fourth illustrative approach: the CSI value considering only the I_CSI-IM and the CSI value considering only the I_RRM-IM are reported together.

According to the fourth illustrative approach, the UE may calculate the CSI value separately by considering 1) only the I_CSI-IM value measured from the CSI-IM resources according to the existing methods as the amount of interference and 2) considering only the I_RRM-IM value measured from the RRM-IM resources as the amount of interference; and report both of the two CSI values to the eNodeB.

Meanwhile, the CSI reporting based on the amount of interference measured from the RRM-IM resources may be applied only for the case where the eNodeB requests the UE to perform aperiodic reporting.

Similarly, when requesting the UE to perform periodic/aperiodic CSI reporting, the eNodeB may configure whether the UE performs CSI reporting by using the amount of interference measured from the RRM-IM resources as proposed above or whether the UE performs CSI reporting which uses only the CSI-IM resources for interference measurement as in the existing methods.

In the current LTE-A system, when the UE measures and reports the CSI value (for example, CQI, PMI), the UE may use a method for reporting one CSI appropriate across the whole frequency band or a method for reporting multiple CSIs appropriate for the respective subbands. In order for the UE to report the CSIs to the eNodeB for the respective subbands, CSI-RS and CSI-IM resources are distributed evenly across the whole frequency band.

Therefore, in the same way as described above, it may be preferable that the RRM-IM resources are distributed evenly across the whole frequency band to use the RRM-IM resources for measuring CSI and the amount of interference for each subband. Therefore, the present invention proposes that RRM-IM resources are located in the same pattern for each RM or for each group of RBs. In particular, considering the possibility that an LTE-U cell uses a frequency bandwidth larger than 20 MHz, since WLAN signals are transmitted on the bandwidth of at least 20 MHz, interference from a WLAN signal may be varied according to each subband. Therefore, given this situation, it may be necessary to make the amount of interference from RRM-IM resources measured for each subband. At this time, a specific size of the subband for measuring the amount of interference from the RRM-IM resources may be the same as the number of RBs corresponding to 20 MHz (for example, 100 RBs).

Since the WLAN signal is transmitted on the bandwidth of at least 20 MHz when the LTE-U cell uses a bandwidth of up to 20 MHz, the degree of interference due to WLAN signals for each subband may always the same. Therefore, considering this situation, the amount of interference due to the WLAN signals measured in the subband region may be applied in the same way over the whole frequency band. Therefore, considering this situation, the RRM-IM resources may not be necessarily distributed evenly across the whole frequency band but may be located only in the specific frequency region. If may be effective to have the location around the central frequency wherever possible.

III. Third Disclosure: Location of RRM-IM Resources

To measure only the interference due to WLAN BSSs (and other systems) out of the RRM-IM resources, location of the RRM-IM resources have to be the same among LTE cells of the same/different service providers. At this time, there may be the case where cells of different LTE service providers operate in the same unlicensed frequency region (eNodeBs of different LTE service providers are located in the same unlicensed frequency region). In this case, to measure only the interference from WLAN BSSs (and other systems) excluding the interference among different service providers from the RRM-IM resources, it may be preferable that different service providers are synchronized with each other. In case the different service providers are synchronized with each other, interference from the WLAN (and other systems) may be measured by setting the common resource region among cells as the RRM-IM resources. Even when the different service providers are not synchronized with each other, and timing synchronization is thus not met among them, it may be necessary to set the resource region in which interference from WLAN (and other systems) may be measured as the RRM-IM resources.

III-1. RE (Resource Element)

RRM-IM resources may be defined as (multiple) RE resources per RB, and the same RE position may be allocated for the RRM-IM resource for each RB. Specific descriptions will be given with reference to FIG. 13.

Figure 13:
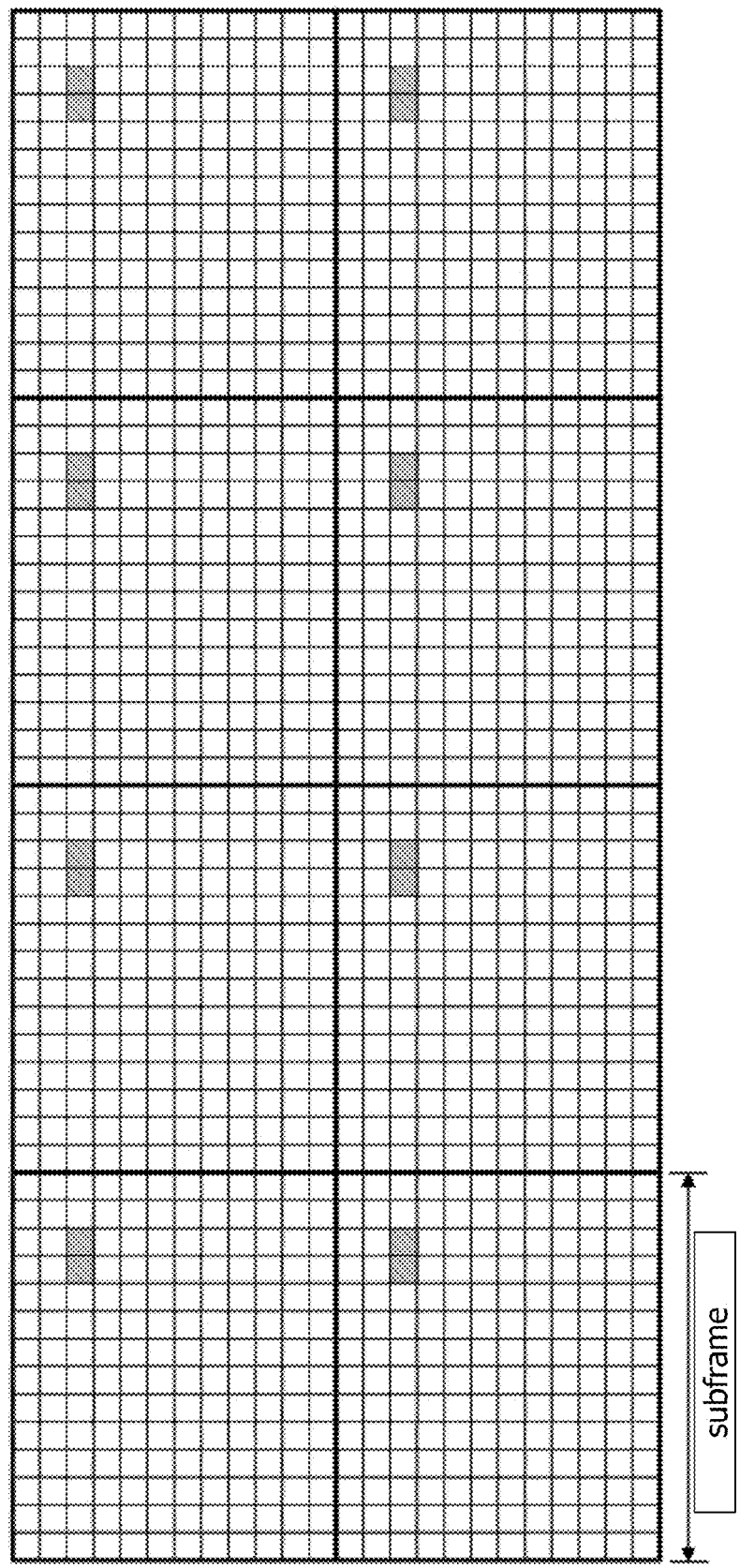
FIG. 13 illustrates an example of RRM-IM resources.

FIG. 13 illustrates an example of RRM-IM resources.

For example, suppose OFDM symbol index of a specific RB is k, subcarrier index is 1, and (k, 1)=(10, 9) and (11, 9) is RRM-IM resource. Then as shown in FIG. 13, REs at the corresponding positions in each RB may be defined as the RRM-IM resources.

The RRM-IM resources may be defined only for part of PRB region, and in this case, a specific RE resource may be set as the RRM-IM resource for the part of the PRB region.

In this case, location of the RRM-IM resource may be fixed. Or the eNodeB may configure the UE for the location of the RRM-IM resource through upper layer signal. In this case, the eNodeB may configure the UE for the location of the RRM-IM resources by using an index value pointing to a specific resource position out of a set of candidate RE positions. In case the RRM-IM resources are defined only for a part of the PRB region, the eNodeB may configure the UE for the location of the PRB in which the RRM-IM resources are located through a upper layer signal. In addition, in case the RRM-IM resources are not defined for each subframe, the eNodeB may configure the UE for the location of a subframe in which the RRM-IM resources are located through a upper layer signal. At this time, configuration of the RRM-IM resource location may be performed through a primary cell (PCell) or a primary cell (PCell)/secondary cell (SCell) operating in the unlicensed band.

The RRM-IM resources may be located (periodically) only in some subframes.

In order for the resource position to be used as the RRM-IM resource, it may be preferable that different service providers are synchronized with each other.

III-2. OFDM Symbol

The RRM-IM resource may be defined by a specific OFDM symbol position. At this time, the RRM-IM resource may exist for each subframe, or it may exist only for some subframes. For example, the RRM-IM resource may be the same as the last OFDM symbol position (OFDM symbol #13) of a subframe. In this case, UEs may measure the amount of interference (for example, RSSI) (from WLAN BSSs) except for the interference from LTE-U cells through the corresponding OFDM symbol region.

At this time, location of the RRM-IM resource (OFDM symbol position or OFDM symbol interval) may be fixed. Or the eNodeB may configure the UE for the location of the RRM-IM resource (OFDM symbol position or OFDM symbol interval) through upper layer signal. In addition, in case the RRM-IM resource does not exist for each subframe, the eNodeB may configure the UE for the location of a subframe in which the RRM-IM resource is located through a upper layer signal. At this time, configuration of the RRM-IM resource position may be performed by a primary cell (PCell) or a primary cell (PCell)/secondary cell (SCell) operating in the licensed band.

The RRM-IM resource may be located (periodically) only for some subframes.

In order for the resource position to be used as the RRM-IM resource, it may be effective to have different service providers synchronized with each other.

III-3. Subcarrier (PRB)

The RRM-IM resource may be defined as a specific PRB region or a specific subcarrier region. This case is advantageous in that even when timing synchronization is not met among LTE-U cells, the RRM-IM resource set at the same position among cells does not receive interference from LTE-U cells. For example, the RRM-IM resource may become a specific PRB region. In another example, the RRM-IM resource may become a specific subcarrier region. A specific example will be described with reference to related drawings.

Figure 14A:
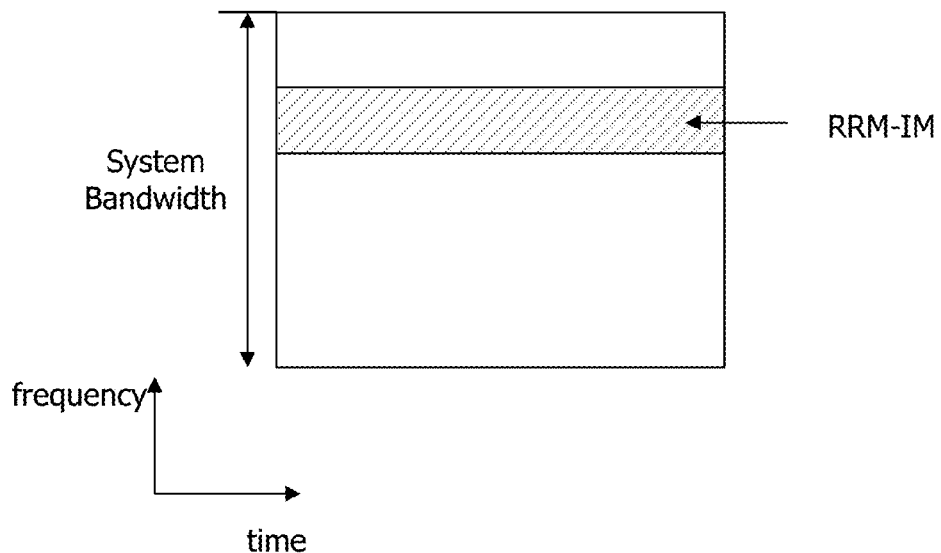
FIGS. 14a and 14b illustrate an example of RRM-IM resources.
Figure 14B:
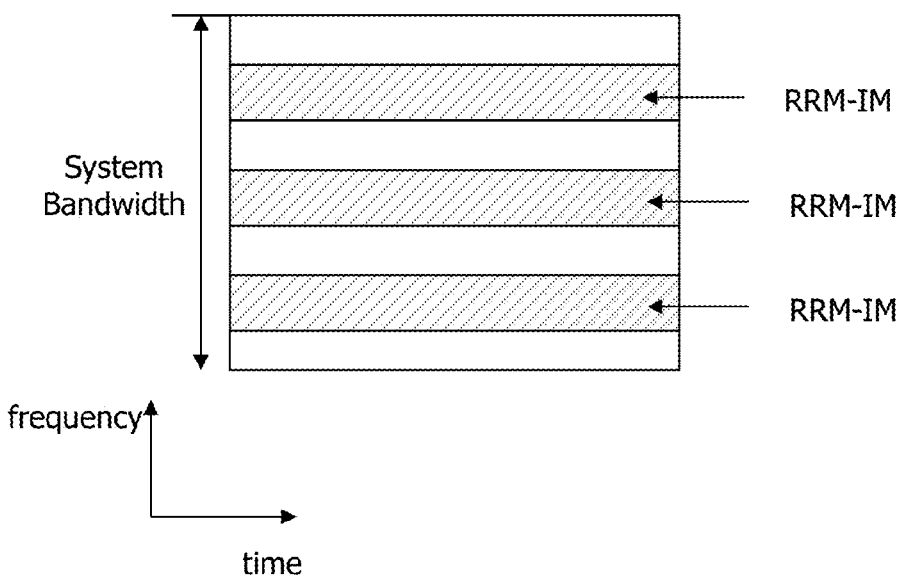

FIGS. 14a and 14b illustrate an example of RRM-IM resources.

As shown in FIG. 14a, RRM-IM resources may be clustered in a specific frequency region or distributed as shown in FIG. 14b.

In case the RRM-IM resources are disposed in a distributive manner, a specific subcarrier region of each PRB or PRB group may be configured as the RRM-IM resource. For example, the position corresponding to subcarrier index 0 of each PRB may be set as the RRM-IM resource. Similarly the position corresponding to the subcarrier index 0 may be set as the RRM-IM resource for every even (or odd) PRB.

The location of the RRM-IM resource (PRB position) may be fixed in advance. Or the eNodeB may configure the UE for the location of the RRM-IM resource (PRB position or PRB position interval) through a upper layer signal.

On the other hand, the RRM-IM resource may not exist for each subframe. Or RRM-IM resource may be located (periodically) only for some subframes.

The eNodeB may configure the UE for the location of a subframe in which the RRM-IM is located through a upper layer signal. At this time, configuration of the location of the RRM-IM resource may be performed through a primary cell (PCell) or primary cell (PCell)/secondary cell (SCell) operating through a licensed band.

The RRM-IM resource provides an advantage that it may be used commonly even when time synchronization is not met among different service providers.

The UE may measure the amount of interference received from the WLAN on the basis of the position of the RRM-IM resource, for example PRB position or PRB position interval. In other words, the UE may measure the amount of interference (namely RSSI) received from the WLAN except for the amount of interference received from the LTE-U system on the basis of the position of the RRM-IM resource, for example PRB position or PRB position interval. After the measurement is completed, the UE may report the measured amount of interference to the eNodeB.

III-4. MBSFN Subframe

The RRM-IM resource may be set within an MBSFN subframe. At this time, within the MBSFN subframe, two OFDM symbol areas corresponding to OFDM symbol #0 and #1 may be used as PDCCH transmission resources. At this time, since the primary cell (PCell) of an LTE-U eNodeB may schedule the PDSCH of a secondary cell (SCell) through cross-component scheduling, considering that the secondary cell (SCell) does not transmit the PDCCH, the present invention proposes using the entire or part of OFDM symbol regions of the OFDM symbol #0 and #1 of the MBSFN subframe as the RRM-IM resources. In this case, receiving the position information of a specific MBSFN subframe, the UE may consider the entire or part of OFDM symbol regions of the OFDM symbol #0 and #1 of the corresponding subframe to be RRM-IM resources.

Similarly the entire subframe regions of the MBSFN subframe may be used as the RRM-IM resources. In this case, receiving position information of a specific MBSFN subframe, the UE may consider the corresponding subframe region to be an RRM-IM resource.

Also, the region other than a CRS-dedicated RE of the MBSFN subframe may be used as the RRM-IM resource. In this case, receiving the position information of a specific MBSFN subframe, the UE may determine the region other than the RE resource to which a CRS is transmitted from among the corresponding subframe regions as the RRM-IM resource.

Also, part of resource regions of the MBSFN subframe (for example, part of OFDM symbols, part of PRBs, part of REs) may be used as the RRM-IM resource. In this case, receiving the position information of a specific MBSFN subframe, the UE may determine that some resource regions defined in advance or preset in the corresponding subframe region as the RRM-IM resources. In this case, position of the RRM-IM resource within the MBSFN subframe may be fixed in advance. Also, the eNodeB may configure the UE for the location of the RRM-IM resource in the MBSFN subframe through a upper layer signal. At this time, configuration of the location of the RRM-IM resource may be performed through the PCell or PCell/SCell operating in the licensed band.

Characteristically, such RRM-IM resources may be located only in some MBSFN subframes.

In order for such resource position to be used as the RRM-IM resource, it may be effective for different service providers to be synchronized with each other.

III-5. Special Subframe in TDD

RRM-IM resource may be set within a special subframe. At this time, in case an LTE-U cell includes the special subframe, DwPTS region of the special subframe may be used as the RRM-IM resource. In this case, knowing the DwPTS region of the special subframe, the UE may consider the corresponding DwPTS region to be an RRM-IM resource. In this case, the RE region in which a specific CRS is transmitted may be excluded from the RRM-IM resources.

Similarly, in case the LTE-U cell includes a special subframe, only part of a time interval (or part of resource regions) within the DwPTS region of the special subframe may be used as RRM-IM resources. In this case, knowing the DwPTS region of the special subframe, the UE may determine only part of the time interval defined in advance or pre-configured from within the corresponding DwPTS region as RRM-IM resources. At this time, position of the RRM-IM resources within the DwPTS may be fixed in advance. Also, the eNodeB may configure the UE for the location of the RRM-IM resources within the DwPTS through a upper layer signal. At this time, configuration of the RRM-IM resource location may be performed through PCell or PCell/SCell operating through a licensed band.

Also, in case the LTE-U cell includes a special subframe, the entire regions of the corresponding special subframe may be used as RRM-IM resources. In this case, knowing the position of the special subframe, the UE may consider the entire regions of the corresponding subframe to be RRM-IM resources. In this case, the RE region in which a CRS is transmitted may be excluded from the RRM-IM resources.

Such an RRM-IM resource may be located only in some special subframes.

In order for the resource location to be used as an RRM-IM resource, it may be effective for different service providers to be synchronized with each other.

On the other hand, location of an RRM-IM resource may be determined in the form of a combination of proposals described above. For example, in the case of a combination of the proposal of Section III-1 and the proposal of Section III-3, only a specific (part of) RE region of a specific (part of) RB region may be used as an RRM-IM resource. In another example, in the case of a combination of the proposal of Section III-2 and the proposal of Section III-1, only a specific (part of) subcarrier region of a specific (part of) OFDM symbol region may be used as an RRM-IM resource.

At this time, the RRM-IM resource may be defined commonly for the entire LTE-U cells. In this case, location of the RRM-IM resource may be fixed in advance.

On the other hand, the RRM-IM resource may be a value that the UE receives from the eNodeB through SIB or a upper layer signal. At this time, setting of the RRM-IM resources may be performed through a PCell or a PCell/SCell operating in a licensed band. In case the eNodeB configures the UE for an RRM-IM resource, it may be effective for the LTE-U cells adjacent to each other to have the same RRM-IM resource position. To this purpose, the eNodeBs in close proximity to each other may cooperate with each other to determine an appropriate RRM-IM position.

When the LTE-U cell has a maximum bandwidth of 20 MHz, since a WLAN signal is transmitted with a bandwidth of at least 20 MHz, degree of interference due to the WLAN signal may always be the same for each subband. Therefore, considering this case, the amount of interference due to WLAN signals measured in the subband region may be applied equally for the entire frequency bands. Therefore, considering the aforementioned situation, the RRM-IM resources do not have to be distributed evenly across the whole frequency band but may be defined only for a specific frequency region.

Meanwhile, a signal transmitted from the WLAN system exhibits a relatively short length ranging from tens of μsec to a few msec and is transmitted in the form of a burst signal. Therefore, it may be difficult for the interference due to WLAN signals measured over a particular time range to be applied across the whole subframe region or over a few subframes. Therefore, considering such a situation, it may be desirable that RRM-IM resources are distributed as evenly as possible in the time domain.

IV. Fourth Disclosure: Application of RRM-IL-IM Resources (Measuring Interference from the LTE Systems of Different Service Providers)

Interference from the LTE cells of different service providers may be obtained by measuring the whole interference received from the systems other than the original LTE system and excluding (subtracting) the interference measurement from non-LTE systems (for example, interference from the WLAN). At this time, the interference coming from systems other than the LTE system of the original service provider refers to the interference which includes all of the interference comprising the interference from LTE cells of different service providers and interference from non-LTE systems (for example, WLAN). Also, interference from non-LTE systems refers to the interference from non-LTE systems except for the interference from LTE cells of the original/other service providers. At this time, to measure interference from non-LTE systems (for example, interference from the WLAN), the method of Section II which employs the RRM-IM resources as described in Section III may be used.

For the convenience of describing the present invention, the amount of interference received from systems other than the LTE system is called I_RRM-IL-IM. At this time, I_RRM-IL-IM is measured from RRM-IL-IM resources.

RRM-IL-IM resources are used to measure the remaining interference other than the interference from the LTE cell of the original service provider. At this time, in order to measure the remaining interference except for the interference from the cell operated by the original service provider, locations of the RRM-IL-IM resources need to be distinguished among service providers. In the meantime, the location of the RRM-IL-IM resource may be the same among the cells operated by the same service provider (as the cells are synchronized with each other). Therefore, the UE may measure the amount of interference (namely I_RRM-IL-IM) coming from systems other than the LTE system of the same service provider by using the RRM-IL-IM resources.

To measure interference from LTE cells of different service providers and interference from systems other than LTE systems of the same service provider, namely non-LTE systems, a plurality of interference measurement resources showing different interference effects may be allocated to the UE. The UE which has received a plurality of interference measurement resources may estimate interference for each resource and report the estimation result to the eNodeB. At this time, the interference measurement resources may be divided into resources located in a common region among LTE cells operated by the same service provider and resources located in a region shared by all of the cells irrespective of service providers. For example, the eNodeB may configure the UE for resources for interference measurement located in a common region among LTE cells operated by the same service provider (which may be the same as the RRM-IL-IM resource described above) and resources located in a region common to all of the cells irrespective of service providers (which may be the same as the RRM-IM resources described above) through a upper layer signal (or location/configuration of the corresponding resources may be set from an SIB or fixed in advance), and interference measurement result obtained from each resource region may be reported separately to the eNodeB.

At this time, the location (III-1 to III-5 and a combination thereof) of the resources introduced in Section III above may be used for setting the location of the RRM-IL-IM resource. At this time, location of the RRM-IL-IM resource and location of the RRM-IM resource of a specific cell may be configured/located separately. Also, the location of the RRM-IL-IM resource and the location of the RRM-IM resource may be configured/located so that the locations of the resources are always different from each other.

At this time, in general, LTE signals are transmitted over the whole time domain within one subframe, and in the frequency domain, signals are transmitted only in some regions according to the distribution of PDSCH. Therefore, in order to measure interference conditions with respect to LTE signals for each subband, it may be effective to have interference measurement resources (for example, RRM-IL-IM) distributed uniformly along the frequency axis. In this case, the interference measurement resources for measuring interference coming from systems other than the LTE system operated by the same service provider (for example, RRM-IL-IM) may be distributed evenly along the frequency axis. This situation will be described with reference to an illustrative drawing as follows.

Figure 15A:
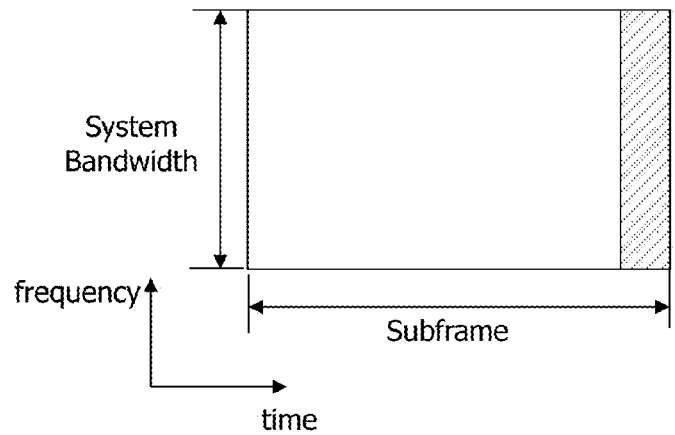
FIGS. 15a and 15b illustrate an example of resources for measuring interference.
Figure 15B:
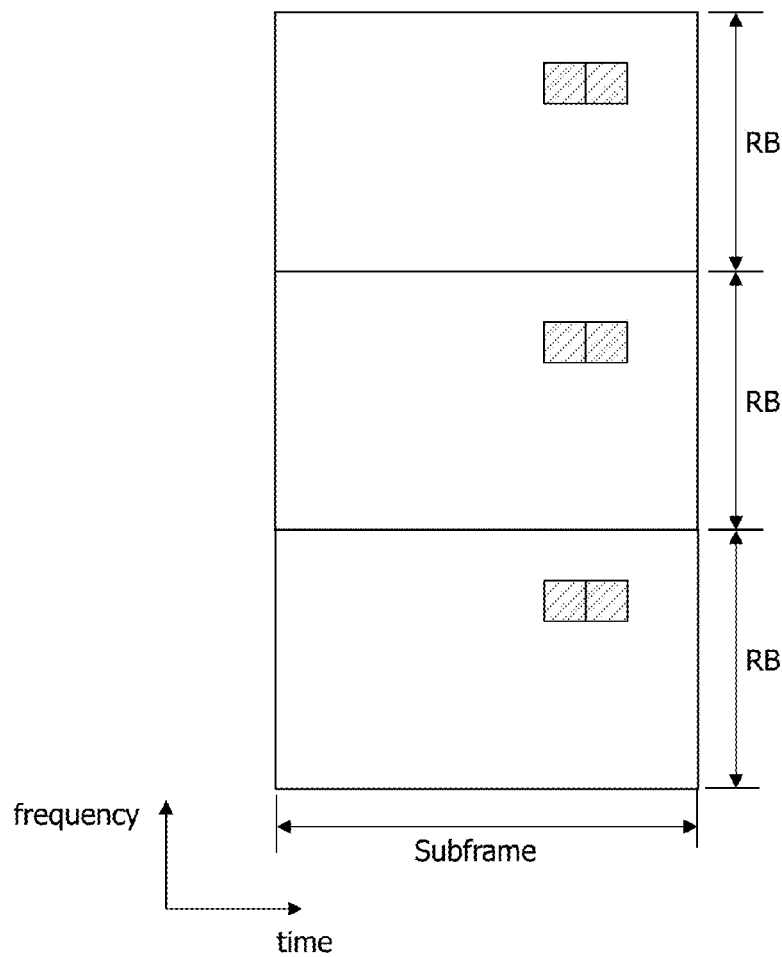

FIGS. 15a and 15b illustrate an example of resources for measuring interference.

As shown in FIG. 15a, a particular OFDM symbol may be set as an interference measurement resource, or as shown in FIG. 15b, part of RE resources in each RB may be set as an interference measurement resource.

In general, WLAN signals are transmitted over the whole 20 MHz frequency region except for the guard band region and DC frequency region, and in the time domain, the WLAN signals are transmitted with a variable length ranging from tens of μsec to a few msec depending on the frame length. Therefore, in order to measure interference conditions with respect to the WLAN signal in the time domain, it may be effective to have interference measurement resources (for example, RRM-IM) distributed evenly along the time axis. In this case, the interference measurement resources for measuring interference coming from systems other than the LTE system (for example, RRM-IM) may be distributed evenly along the time axis. This situation will be described with reference to an illustrative drawing as follows.

Figure 16:
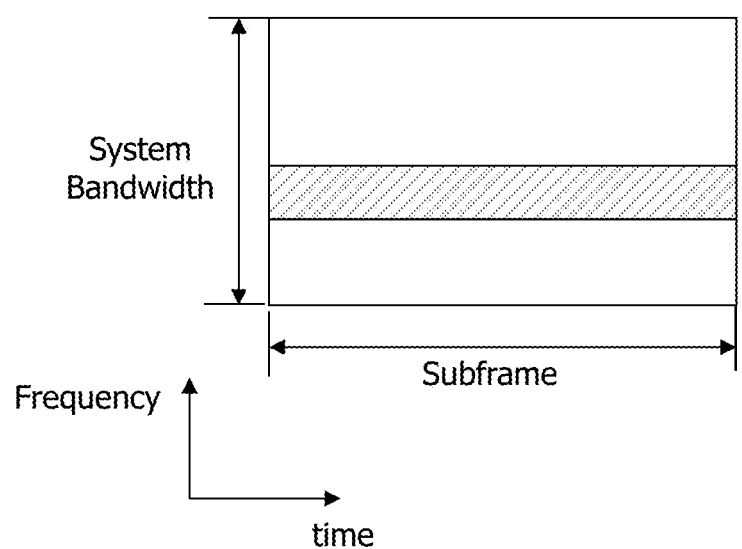
FIG. 16 illustrates another example of resources for measuring interference.

FIG. 16 illustrates another example of resources for measuring interference.

As shown in FIG. 16, a specific subcarrier may be set as an interference measurement resource.

Meanwhile, interference from the LTE cell operated by a different service provider may be obtained by excluding (subtracting) the measurement of the interference from the non-LTE system (after measurement of I_RRM-IM from the RRM-IM resource) from the measurement of the interference from other systems other than the LTE system operated by the same service provider (after measurement of I_RRM-IL-IM from the RRM-IL-IM resource). At this time, to calculate interference from LTE cells operated by different service providers, it may be effective to measure the interference coming from systems other than the LTE system operated by the same service provider (namely I_RRM-IL-IM) and the interference coming from non-LTE systems (namely I_RRM-IM) at the same/similar location wherever possible, which are measured for calculating interference from LTE cells operated by different service providers, so that the interference may exhibit the same behavior. Therefore, the interference measurement resources (for example, RRM-IM, RRM-IL-IM) may be distributed evenly along time/frequency axis so that the RRM-IL-IM resource for which it is better to be distributed evenly along the frequency axis and the RRM-IM resource for which it is better to be distributed along the time axis may have the same/similar resource location. Therefore, the present invention proposes setting a specific subcarrier region as an interference measurement resource (for example, RRM-IM, RRM-IL-IM) for each PRB or for each group of PRBs.

The name of the base station used in the present invention may use a generic terminology including RRH (Remote Radio Head), eNodeB, TP (Transmission Point), RP (Reception Point), and relay. In what follows, for the convenience of description, the present invention is described on the basis of the 3GPP LTE system. However, the system to which the present invention is applied may be extended to other systems beyond the 3GPP LTE system.

Embodiments of the present invention described above may be implemented through various means. For example, embodiments of the present invention may be implemented by hardware, firmware, software, or a combination thereof. Detailed descriptions will be given with reference to related drawings.

Figure 17:
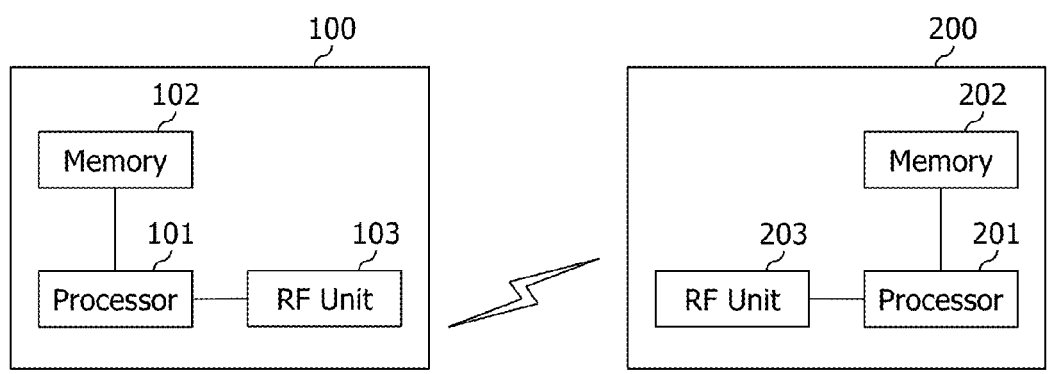
FIG. 17 illustrates a block diagram of a wireless communication system in which a disclosure of the present invention is implemented.

FIG. 17 illustrates a block diagram of a wireless communication system in which a disclosure of the present invention is implemented.

An eNodeB 200 includes a processor 201, memory 202, and RF (Radio Frequency) unit 203. The memory 202, being connected to the processor 201, stores various kinds of information for operating the processor 201. The RF unit 203, being connected to the processor 201, transmits and/or receives a radio signal. The processor 201 implements a proposed function, process and/or method. In the embodiments described above, operation of the eNodeB may be realized by the processor 201.

A UE 100 includes a processor 101, memory 102, and RF (Radio Frequency) unit 103. The memory 102, being connected to the processor 101, stores various kinds of information for operating the processor 101. The RF unit 103, being connected to the processor 101, transmits and/or receives a radio signal. The processor 101 implements a proposed function, process and/or method.

The processor may comprise Application-Specific Integrated Circuit (ASIC), other chipsets, logical circuit, and/or data processing device. The memory may include Read-Only Memory (ROM), Random Access Memory (RAM), flash memory, memory card, storage medium and/or other storage devices. The RF unit may include a baseband circuit for processing a radio signal. If an embodiment is implemented by software, the techniques described above may be implemented in the form of a module (process or function) which performs the function described above. A module may be stored in the memory and may be executed by the processor. The memory may be located inside or outside the processor and may be connected to the processor through a well-known means.

The embodiments of the present invention above are described by using flow diagrams comprising steps or blocks, but the present invention is not limited to the specific order of steps; some steps may be performed in a different order with other steps or may be performed simultaneous with other steps. Also it should be understood by those skilled in the art that the steps introduced in the diagrams are not exclusive to each other, other steps may be added, or one or more steps may be deleted without affecting the technical scope of the present invention.

What is claimed is:

1. A method for measuring interference in a user equipment using a licensed band and an unlicensed band through LTE-A (Long Term Evolution-Advanced) based carrier aggregation (CA), comprising:
receiving configuration information on at least one or more resources for measuring interference in the unlicensed band from a base station;
measuring interference caused by Wireless Local Area Network (WLAN) at the at least one or more resources in the unlicensed band except for interference caused by LTE or the LTE-A; and
reporting the measured interference to the base station, wherein the configuration information includes information about a position of a specific subframe in a time domain.

2. The method of claim 1, wherein the configuration information further includes information about a specific PRB (Physical Resource Block) region or a sub-carrier region in a frequency domain.

3. The method of claim 2, wherein the specific PRB region or sub-carrier region is distributed across the whole system bandwidth.

4. The method of claim 1, wherein the configuration information is received through upper layer signaling.

5. The method of claim 1, wherein the configuration information is obtained from a primary cell or a secondary cell operated by the base station in the unlicensed band.

6. The method of claim 1, further comprising:
measuring the interference caused by LTE or the LTE-A in both-sided edges of the unlicensed band.

7. The method of claim 1, wherein the at least one or more resources are located in a middle area of the unlicensed band.

8. The method of claim 1, wherein the specific subframe is used to measure the interference caused by WLAN.

9. The method of claim 8, wherein the specific subframe is configured with a zero power by the LTE or the LTE-A and for radio resource management—Interference Measurement (RRM-IM).

10. The method of claim 1, further comprising:
calculating a received signal strength indicator (RSSI), wherein RSSI=RSSI_I−α*RSSI_w,
wherein RSSI_w denotes a total received power,
wherein RSSI_I denotes a power measured in resources configured for an RRM-IM, and
wherein a denotes an amount of the resources used for measuring RSSI_I/an amount of resources used for measuring RSSI_w.

11. The method of claim 1, further comprising:
measuring interference on at least one or more resources configured for channel status information—interference measurement (CSI-IM); and
reporting information on the measured interference on the at least one or more resources configured for CSI-IM.

12. A user equipment (UE) using a licensed band and an unlicensed band through LTE-A (Long Term Evolution-Advanced) based carrier aggregation (CA), comprising:
a radio frequency (RF) receiver; and
a processor configured to receive configuration information on at least one or more resources for measuring interference in the unlicensed band from a base station through the RF receiver, to measure interference caused by Wireless Local Area Network (WLAN) at the at least one or more resources in the unlicensed band except for interference caused by LTE or the LTE-A, and to report the measured interference to the base station,
wherein the configuration information includes information about a position of a specific subframe in a time domain.

13. The UE of claim 12, wherein the configuration information further includes information about a specific PRB (Physical Resource Block) region or a sub-carrier region in a frequency domain.

14. The UE of claim 13, wherein the specific PRB region or sub-carrier region is distributed across the whole system bandwidth.

15. The UE of claim 12, wherein the configuration information is received through upper layer signaling.

16. The UE of claim 12, wherein the configuration information is obtained from a primary cell or a secondary cell operated by the base station in the unlicensed band.

* * * * *